United States Patent
Gill

(10) Patent No.: US 9,833,842 B2
(45) Date of Patent: Dec. 5, 2017

(54) RAIL SHOE ASSEMBLY

(71) Applicant: Hougen Manufacturing, Inc., Swartz Creek, MI (US)

(72) Inventor: Jeffrey Gill, Davison, MI (US)

(73) Assignee: HOUGEN MANUFACTURING, INC., Swartz Creek, MI (US)

( * ) Notice: Subject to any disclaimer, the term of this patent is extended or adjusted under 35 U.S.C. 154(b) by 0 days.

(21) Appl. No.: 15/215,660

(22) Filed: Jul. 21, 2016

(65) Prior Publication Data

US 2017/0087643 A1    Mar. 30, 2017

Related U.S. Application Data

(60) Provisional application No. 62/234,174, filed on Sep. 29, 2015.

(51) Int. Cl.
*B23B 45/14* (2006.01)
*B23B 41/00* (2006.01)
(Continued)

(52) U.S. Cl.
CPC .......... *B23B 41/006* (2013.01); *B23Q 9/0042* (2013.01); *B25H 1/0064* (2013.01);
(Continued)

(58) Field of Classification Search
CPC .. B23D 2277/82; B25H 1/0021; B25H 1/005; B25H 1/0064; E01B 31/06;
(Continued)

(56) References Cited

U.S. PATENT DOCUMENTS

| 415,198 A | 11/1889 | Heinbach |
|---|---|---|
| 1,178,567 A | 4/1916 | Wuerpel |

(Continued)

FOREIGN PATENT DOCUMENTS

| CA | 2 867 560 A1 | 4/2015 |
|---|---|---|
| DE | 10 2014 115 123 A1 | 4/2015 |

(Continued)

OTHER PUBLICATIONS

Machine-Assisted English language abstract for DE 10 2014 115 123 extracted from espacenet.com database on Sep. 15, 2016, 3 pages.
(Continued)

*Primary Examiner* — Daniel Howell
(74) *Attorney, Agent, or Firm* — Howard & Howard Attorneys PLLC

(57) ABSTRACT

A rail shoe assembly for mounting a drilling machine to a rail of a railway track, with the drilling machine including a drill, a cutter, and a support frame with the support frame mounted to the rail, includes a base adapted to be positioned with respect to the rail and adapted to be coupled to the support frame. The rail shoe assembly also includes an adjustable bar coupled to and slideable relative to the base. The adjustable bar has a bottom edge for engagement with the rail. The adjustable bar defines a plurality of position indicators and the base defines a plurality of mounting chambers. At least one of the plurality of position indicators and at least one of the plurality of mounting chambers are alignable at a predetermined position for positioning said base relative to the rail such that the drill and cutter are positioned relative to the rail.

24 Claims, 27 Drawing Sheets

(51) Int. Cl.
*B23Q 9/00* (2006.01)
*B25H 1/00* (2006.01)
*E01B 31/06* (2006.01)

(52) U.S. Cl.
CPC .......... *E01B 31/06* (2013.01); *B23B 2215/32* (2013.01); *B23B 2260/004* (2013.01); *B23B 2260/088* (2013.01)

(58) Field of Classification Search
CPC . B23B 41/003; B23B 41/006; B23B 2215/32; B23B 45/14; B23Q 9/0042
See application file for complete search history.

(56) References Cited

U.S. PATENT DOCUMENTS

| | | | |
|---|---|---|---|
| 1,408,872 A | | 3/1922 | Everett |
| 1,427,982 A | | 9/1922 | Tegeler |
| 1,502,339 A | * | 7/1924 | Jimerson ................. E01B 31/06 408/91 |
| 1,966,836 A | | 7/1934 | Talboys |
| 2,014,172 A | | 9/1935 | Forbes et al. |
| 2,201,032 A | | 5/1940 | Everett |
| 2,887,908 A | | 5/1959 | Miller |
| 3,273,424 A | | 9/1966 | Hughes |
| 3,706,505 A | | 12/1972 | Stougaard |
| 3,945,749 A | | 3/1976 | McIlrath |
| 4,753,556 A | | 6/1988 | Solko |
| 4,911,587 A | | 3/1990 | Stych |
| 5,203,650 A | | 4/1993 | McCourtney |
| 5,348,428 A | * | 9/1994 | Turner ................. B25H 1/0064 408/111 |
| 5,409,328 A | | 4/1995 | Noda |
| 5,924,828 A | | 7/1999 | Lefavour et al. |
| 5,938,378 A | | 8/1999 | Omi et al. |
| 6,264,407 B1 | | 7/2001 | Tinken |
| 8,491,235 B2 | * | 7/2013 | Omi ........................ E01B 31/06 408/76 |

FOREIGN PATENT DOCUMENTS

| | | | | |
|---|---|---|---|---|
| EP | 0 866 168 A1 | | 9/1998 | |
| JP | 2001252805 A | * | 9/2001 | |
| WO | WO 0230602 A1 | * | 4/2002 | ........... B23B 41/006 |

OTHER PUBLICATIONS

Dubuis, "DP3AC-2/DP3AC-2S Percuese De Rail", Jan. 2010, 2 pages.
Dubuis, "DP3TH Percuese De Rail", Jan. 2010, 2 pages.
Rotobroach Ltd., "Rhino E Rail Rail Drilling Machine Model No. CM/127/1 CM 1/27/3", Issue 10, Dec. 2012, pp. 1-24.
Rotobroach Ltd., "Rhino Petrol Driven Rail Drilling Machine Model No. RD074", Issues 4 and 5, Apr. 28, 2010 and Apr. 10, 2012, respectively, 28 pages.
Stanley Hydraulics, "Rail Drilling Machine DP3TH/DP3AC-2S", 2015, downloaded from http://stanleyhydraulics.com/products/rail-drilling-machine on Apr. 27, 2015.

* cited by examiner

RAIL SHOE ASSEMBLY

CROSS-REFERENCE TO RELATED APPLICATIONS

The subject patent application claims priority to and all the benefits of U.S. Provisional Patent Application No. 62/234,174 filed on Sep. 29, 2015, which is herein incorporated by reference in its entirety.

BACKGROUND OF THE INVENTION

1. Field of the Invention

The invention generally relates to a drill machine mountable to a rail of a railway track and, more particularly, to a rail shoe assembly coupled to the drill machine.

2. Description of the Related Art

In the railway industry, holes often need to be drilled into a rail having a rail profile for various applications. For example, to combine different sections of rail, a connecting plate (also commonly referred to a fishplate) is used to reinforce and connect two sections of rail to one another. To properly use a connecting plate, multiple holes must be drilled into each of the sections of rail.

Prior to connecting different sections of rail with the connecting plate, a drill machine is used to drill a predetermined number of holes in the rail. Generally, each hole is drilled at a predetermined location, which is typically determined based on the particular rail profile.

Typically, the drill machine includes a drill, a cutter coupled to the drill, a support frame coupled to the drill, and a rail shoe assembly mounted to the frame. To accommodate for different rail profiles, different rail shoe assemblies are typically used. However, due to the number of different industry standard rail profiles, use of a different rail shoe assembly for each different rail profile can become tedious, and often adds assembly time, drilling time, and overall cost to drilling.

Accordingly, it is advantageous to use a single rail shoe assembly to accommodate different rail profiles. It is, therefore, desirable to provide a rail shoe assembly that is able to accommodate different rail profiles, which eliminates the need to have multiple rail shoe assemblies.

SUMMARY OF THE INVENTION AND ADVANTAGES

A rail shoe assembly for mounting a drilling machine to a rail of a railway track, with the drilling machine including a drill, a cutter, and a support frame with the support frame mounted to the rail, includes a base adapted to be positioned with respect to the rail and adapted to be coupled to the support frame. The rail shoe assembly also includes an adjustable bar coupled to and slideable relative to the base. The adjustable bar has a bottom edge for engagement with the rail. The adjustable bar defines a plurality of position indicators and the base defines a plurality of mounting chambers. At least one of the plurality of position indicators and at least one of the plurality of mounting chambers are alignable at a predetermined position for positioning the base relative to the rail such that the drill and the cutter are positioned relative to the rail.

Accordingly, the rail shoe assembly is able to accommodate different rail profiles by aligning at least one of the plurality of position indicators with at least one of the plurality of mounting chambers at a predetermined position, which allows the base to be positioned relative to the rail and eliminates the need for multiple rail shoe assemblies to accommodate different rail profiles.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
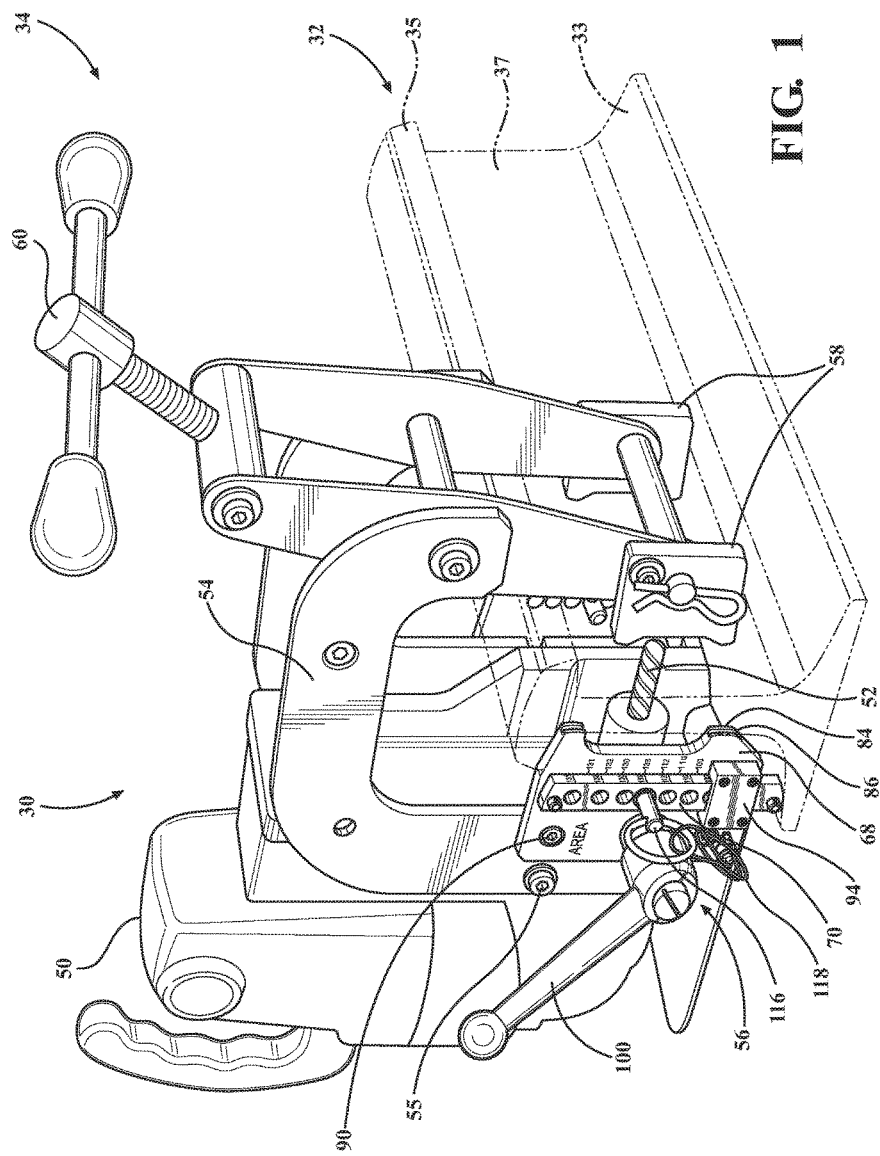
FIG. 1 is a perspective view of a system having a rail, a support frame, a drill coupled to the support frame, a cutter coupled to the drill, and a rail shoe assembly with the rail shoe assembly and the support frame mounted to the rail.
Figure 2:
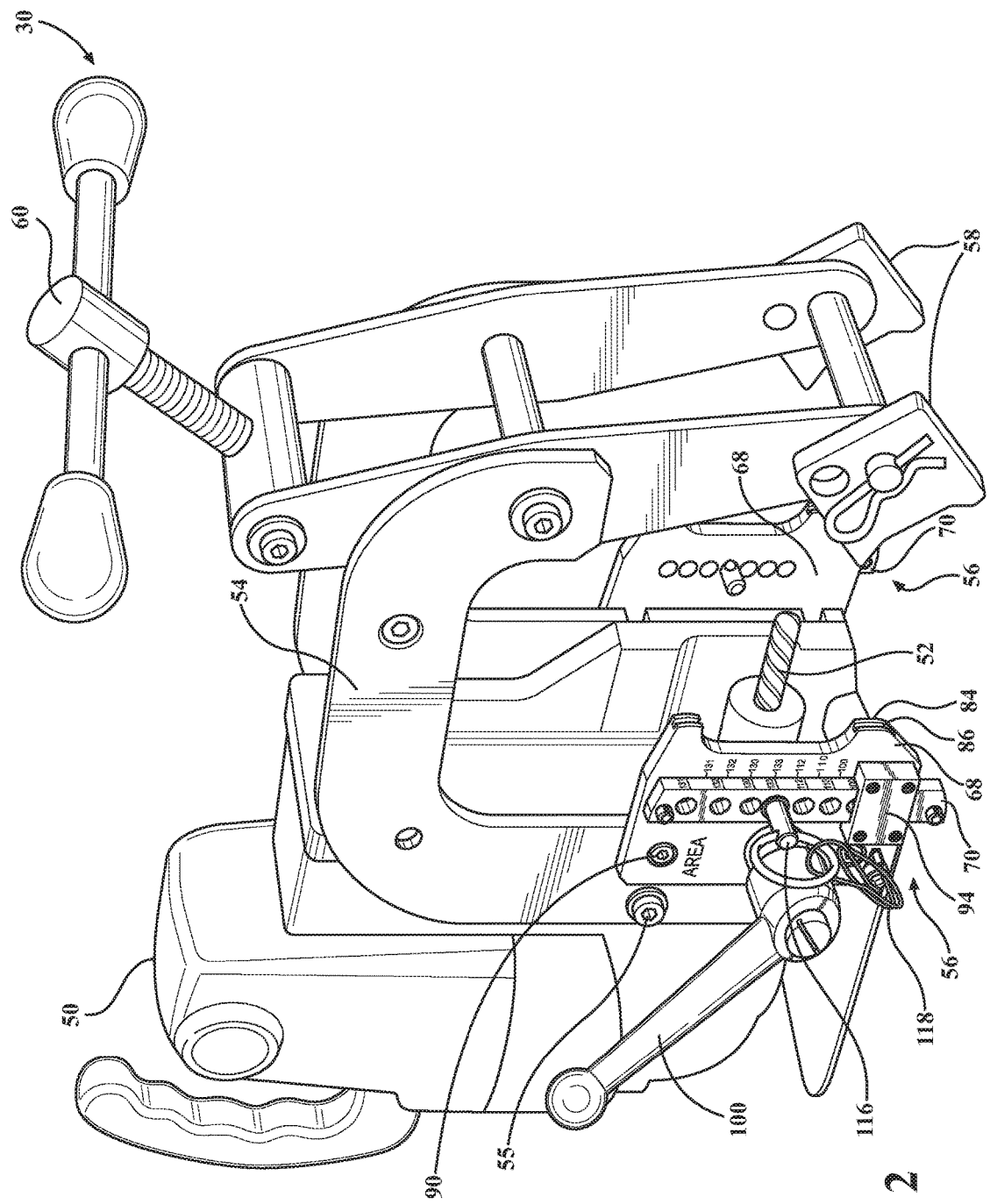
FIG. 2 is a perspective view of the support frame, the drill, the cutter, and the rail shoe assembly of FIG. 1.

With reference to the Figures, wherein like numerals indicate like parts throughout the several views, one embodiment of a drilling machine is generally shown at 30 in FIGS. 1 and 2. The drilling machine 30 is configured to mount to a rail 32 of a railway track, as shown in FIGS. 1 and 2. The drilling machine 30 and the rail 32 collectively form a system 34, as shown in FIG. 1.

Figure 9:
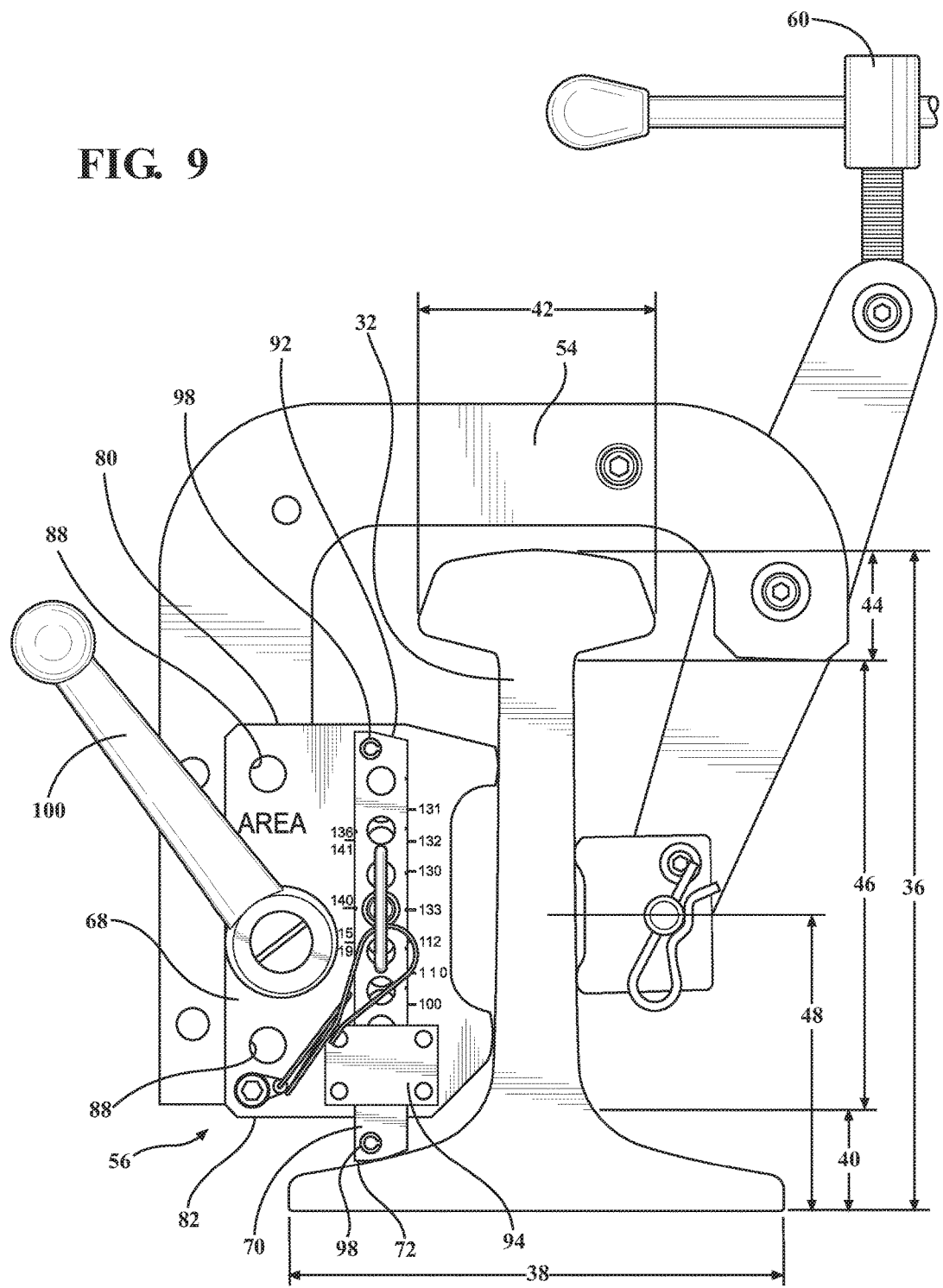
FIG. 9 a side view of the rail, the frame, and the rail shoe assembly of FIG. 1 with the adjustable bar in a first position with respect to the base.

The rail 32 has a foot 33, a head 35, and a web 37 disposed between the foot 33 and the head 35. The foot 33, head 35, and web 37 form a rail profile. With reference to FIG. 9, the rail 32 further has a height 36, a width of the foot 38, a depth of the foot 40, width of the head 42, a depth of the head 44, a fishing depth 46 (depth defined between the foot 33 and the head 35), and a bolt hole elevation 48.

Figure 10:
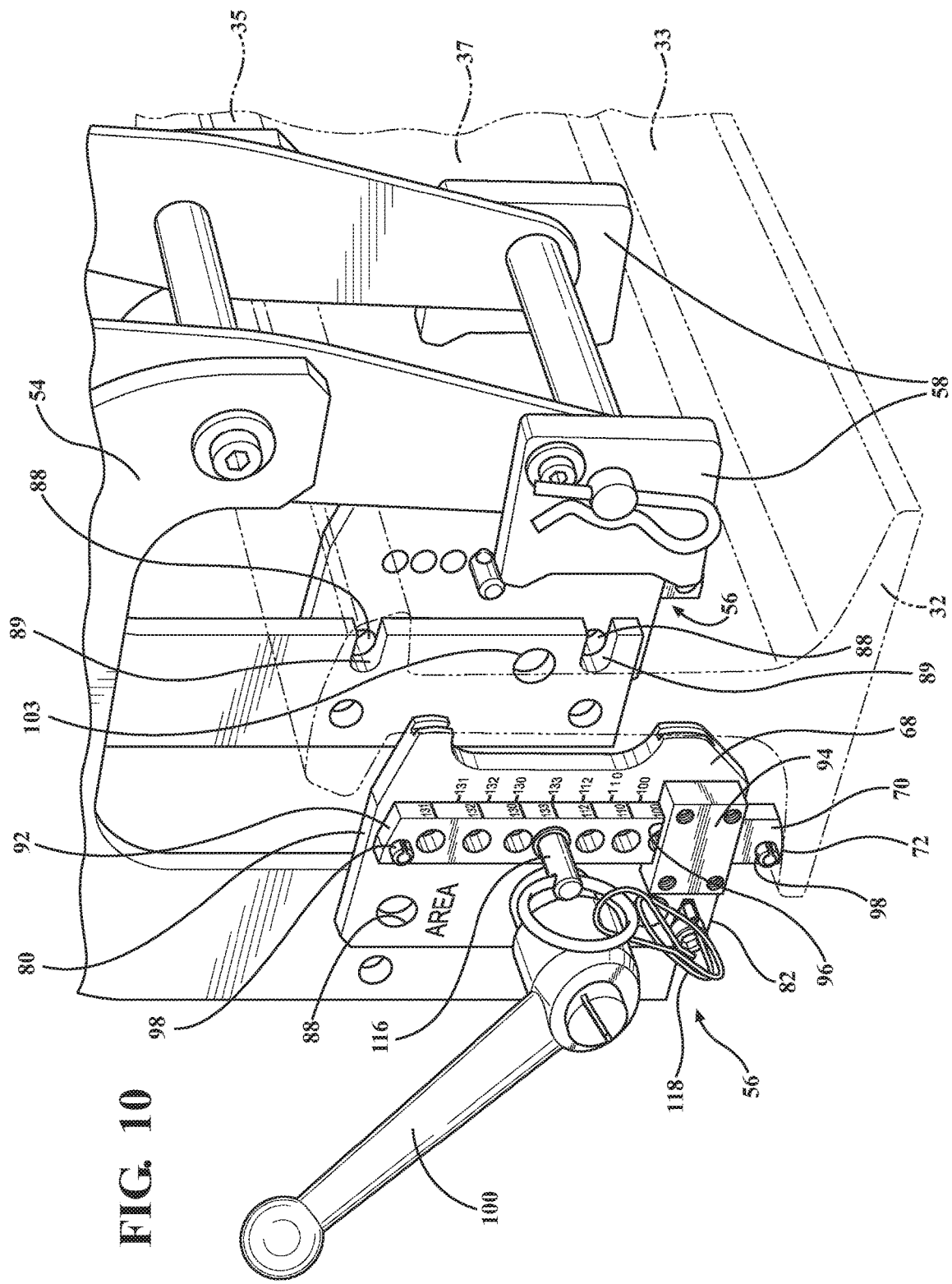
FIG. 10 is a right perspective view of the rail, the frame, and the rail shoe assembly of FIG. 1 with the adjustable bar in the first position with respect to the base.

The drilling machine 30 includes a drill 50. The drilling machine 30 also includes a cutter 52 coupled to the drill 50 with the cutter 52 moveable between a first cutter position and a second cutter position, as described in further detail below. The drilling machine 30 additionally includes a support frame 54 adapted to be mounted to the rail 32. The drill 50 is coupled to the support frame 54, as described in further detail below. It is to be appreciated that the words mounted and coupled may be used interchangeably. For example, the support frame 54 may be adapted to be coupled to the rail 32 or adapted to be mounted to the rail 32. The drilling machine 30 additionally includes a rail shoe assembly 56 coupled to both the support frame 54 and the drill 50. Specifically, the support frame 54 is disposed between the drill 50 and the rail shoe assembly 56, and the support frame 54 is fixed to the drill by fasteners 55. The rail shoe assembly 56 and the support frame 54 fix the drill 50 to the rail 32 to allow the cutter 52 to drill a hole in the rail 32. Typically, two rail shoe assemblies 56 are used to fix the drill 50 to the rail 32, as best shown in FIG. 10. To help secure the support frame 54 to the rail 32, the support frame 54 may include a pair of mounting blocks 58 for engaging the rail 32, and a crank 60 for tightening the support frame 54 to the rail 32.

The drilling machine 30 is typically used for in situ drilling of a hole in the rail 32. Typically, the hole is drilled in the web 37 of the rail 32. This allows a fishplate (not shown) to join two sections of rail 32 together, or other components such as joint bars, switch point protectors, hook bolts, rail clips, etc., to be mounted to the rail 32.

Figure 7:
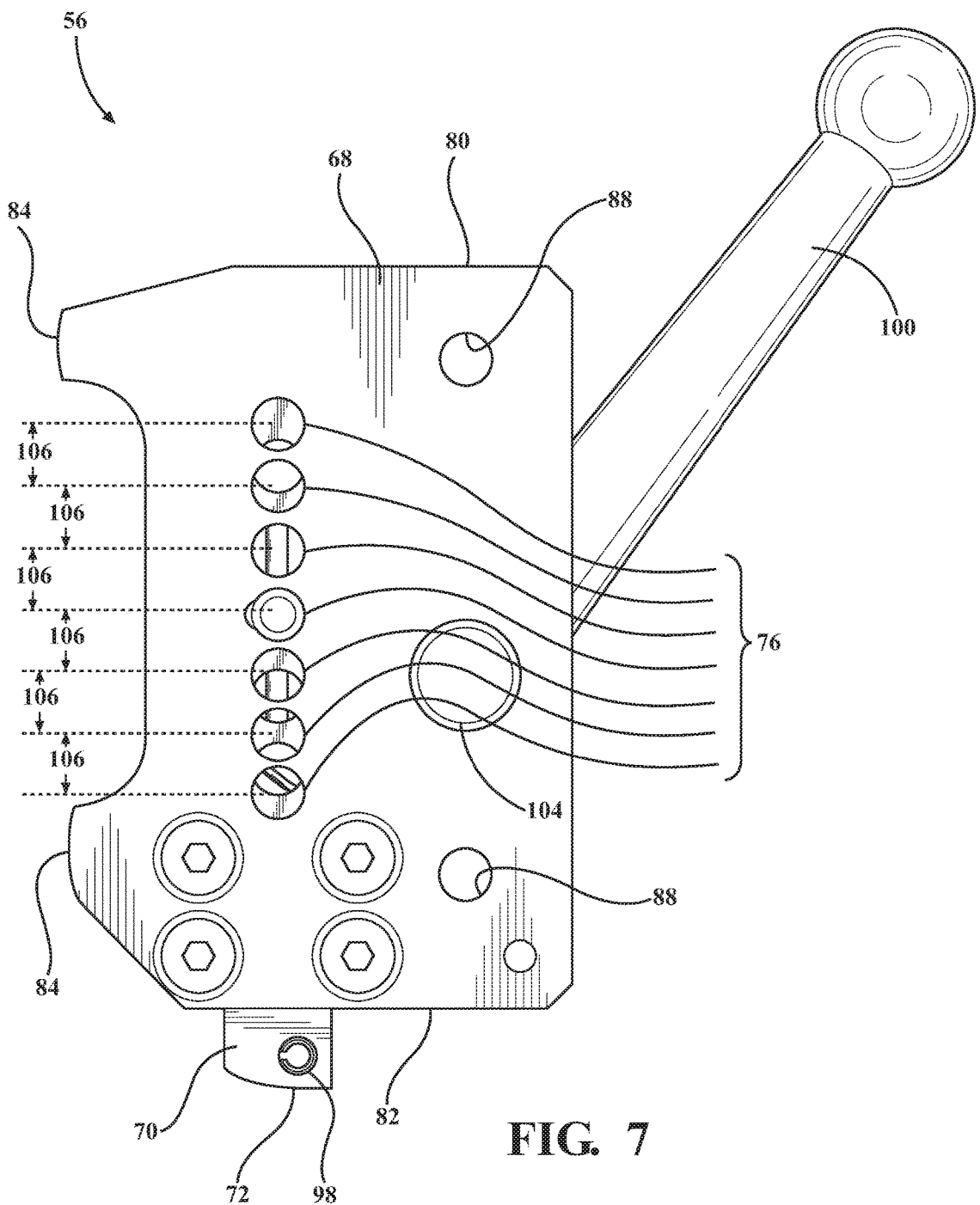
FIG. 7 is a back view of the rail shoe assembly FIG. 1.

The rail shoe assembly 56 includes a base 68. The base 68 is adapted to be positioned with respect to the rail 32 and adapted to be coupled to the support frame 54. When the rail shoe assembly 56 is used in the drilling machine 30, the base 68 is positioned relative to the drill 50 with the support frame 54 disposed between the base 68 and the drill 50. The base 68 is positioned opposite the mounting blocks 58 such that the web 37 of the rail 32 is disposed between the base 68 and the mounting blocks 58. The base 68 is shaped and configured to fit between the foot 33 and the head 35 of the rail 32. The base 68 defines a plurality of mounting chambers 76, as best shown in FIG. 7, which are described in further detail below.

The rail shoe assembly 56 additionally includes an adjustable bar 70 coupled to and slideable relative to the base 68. The adjustable bar 70 has a bottom edge 72 for engagement with the rail 32. Specifically, the bottom edge 72 engages the foot 33 of the rail 32, as described in further detail below. The bottom edge 72 may be curved for engaging the foot 33 of the rail 32.

Figure 8:
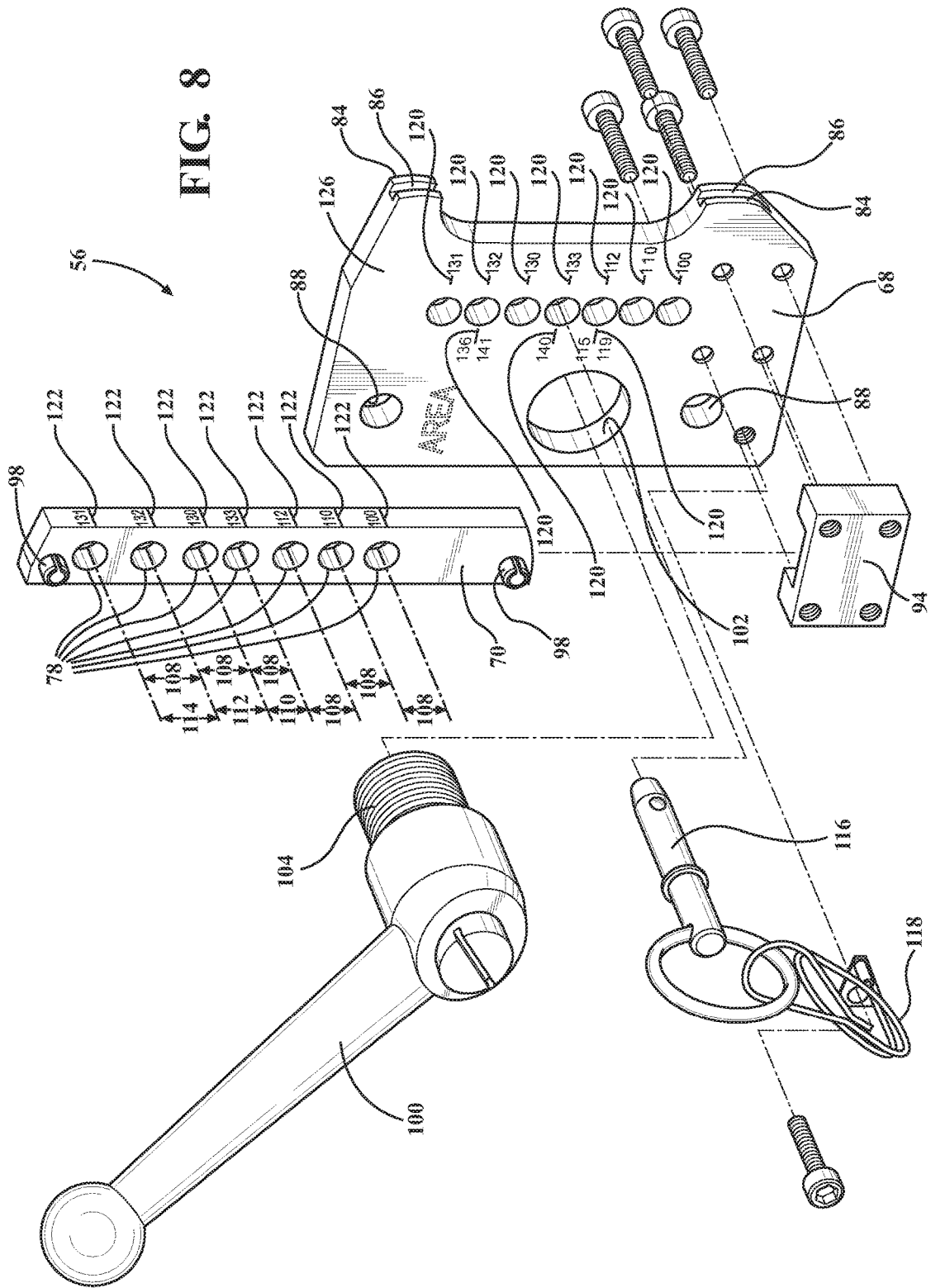
FIG. 8 is an exploded view of the rail shoe assembly of FIG. 1.

The adjustable bar 70 defines a plurality of position indicators 78, as best shown in FIG. 8. At least one of the plurality of position indicators 78 and at least one of the plurality of mounting chambers 76 are alignable at a predetermined position, as described in further detail below.

The base 68 has a configuration for allowing the base 68 to be positioned with respect to the rail 32. The base has a top surface 80 and bottom surface 82 contoured to be disposed between the head 35 and the foot 33 of the rail 32. Typically, the top surface 80 is spaced from the head 35, and the bottom surface 82 is spaced from the foot 33. In one embodiment, the bottom edge 72 of the adjustable bar 70 and the bottom surface 82 may be flush with respect to one another when in the predetermined position. The base 68 may have a one or more front edges 84 defining a cutout 86 to engage the web 37 of the rail 32. Typically, the front edge 84 and the cutout 86 define a 90-degree angle with respect to the base 68, which allows the base 68 to grip the web 37 of the rail 32. In other words, the cutout 86 provides additional contact points for the base 68 to contact the web 37 of the rail 32, which helps prevent the base 68 from moving with respect to the rail 32 when the rail shoe assembly 56 is mounted to the rail 32. The base 68 may define an alignment hole 88 for aligning the base 68 with respect to the drill 50 and/or the support frame 54. Specifically, the support frame 54 may define an indentation 89, and the drill 50 may have an alignment projection 90 extending toward the base 68 such that the alignment projection 90 extends through the indentation 89 and the alignment hole 88 for aligning the base 68 with respect to the drill 50 and/or the support frame 54. It is to be appreciated that the alignment projection 90 may be a bolt, a flange, or any other suitable device for aligning the base 68 with respect to the drill 50 and/or the support frame 54. Typically, in this embodiment, the base 68 defines at least two alignment holes 88, the support frame 54 defines at least two indentations 89, and the drill 50 has at least two alignment projections 90 extending toward the base 68 such that the at least two alignment projections 90 extend through both the at least two indentations 89 and the at least two alignment holes 88 for aligning the base 68 with respect to the drill 50 and/or the support frame 54.

It is to be appreciated that FIGS. 3 and 9-25 show positioning of the rail shoe assembly 56, the support frame 54, and the rail 32 relative to one another. As described above, the support frame 54 is typically fixed to the drill 50 by the fasteners 55, and the base 68 of the rail shoe assembly 56 is fixed to the drill 50 with the support frame 54 disposed between the base 68 and the drill 50.

The adjustable bar 70 has a top edge 92 opposite the bottom edge 72. Typically, the top edge 92 of the adjustable bar 70 remains disposed between the top surface 80 and the bottom surface 82 of the base 68 when in the predetermined position. However, as described in further detail below, the top edge 92 of the adjustable bar 70 is moveable such that the top edge 92 may be disposed above the top surface 80 with respect to the bottom surface 82 of the base 68, and the top edge 92 may be flush with the top surface 80.

The rail shoe assembly 56 may also include a brace 94 mounted to the base 68. The brace 94 and the base 68 define a channel 96 therebetween, as shown in FIG. 10, which allows the adjustable bar 70 to slide within the channel 96 into the predetermined position. Since the adjustable bar 70 is slideable with respect to the base 68, it is desirable to retain the adjustable bar 70 adjacent the base 68. To help assist in the retaining of the adjustable bar 70 adjacent the base 68, the rail shoe assembly 56 includes a pair of pegs 98. Typically, the pair of pegs 98 protrudes from the adjustable bar 70 with respect to the base 68. One of the pegs 98 is disposed adjacent the bottom edge 72 of the adjustable bar 70 and the other peg 98 is disposed adjacent the top edge 92 of the adjustable bar 70. In other words, the pegs 98 are disposed on opposite sides of the brace 94 and the channel 96 for retaining the adjustable bar 70 within the channel 96. It is to be appreciated that other configurations of the adjustable bar 70, the pegs 98, and/or the brace 94 may be used to retain the adjustable bar 70 with respect to the base 68 without departing from the nature of the present invention.

Figure 3:
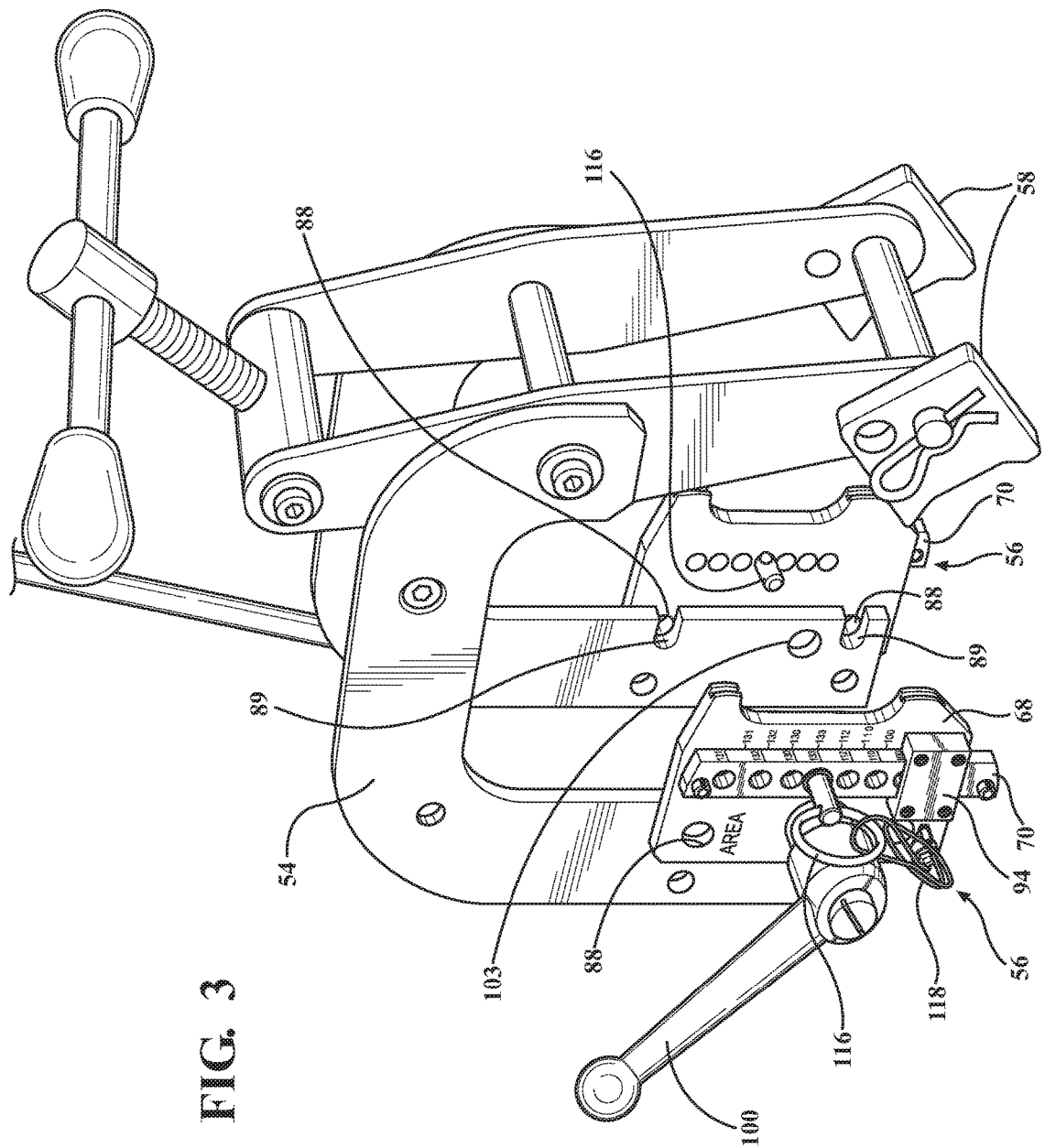
FIG. 3 is a perspective view of the support frame and the rail shoe assembly of FIG. 1.
Figure 5:
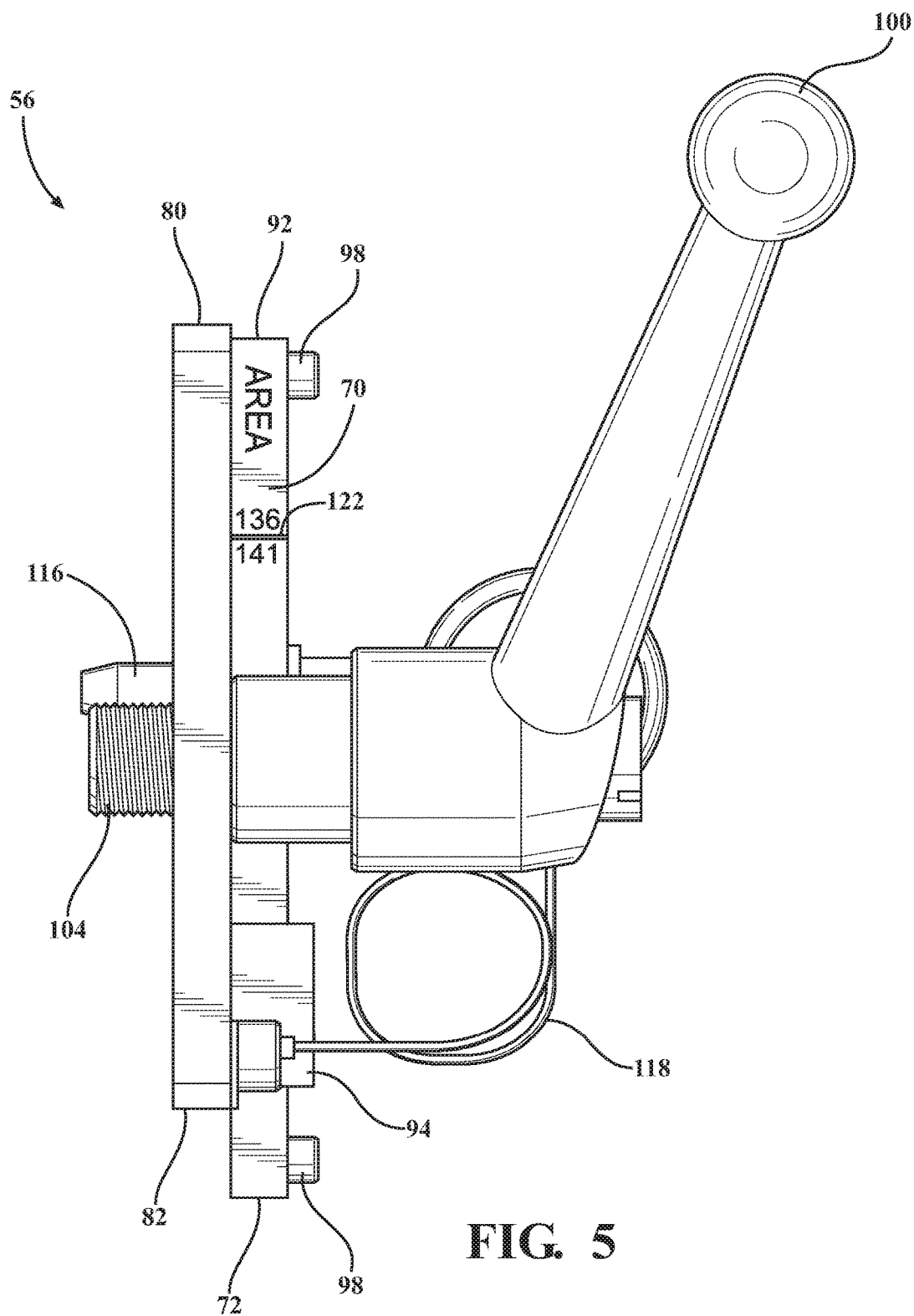
FIG. 5 is a side view of the rail shoe assembly of FIG. 1.
Figure 6:
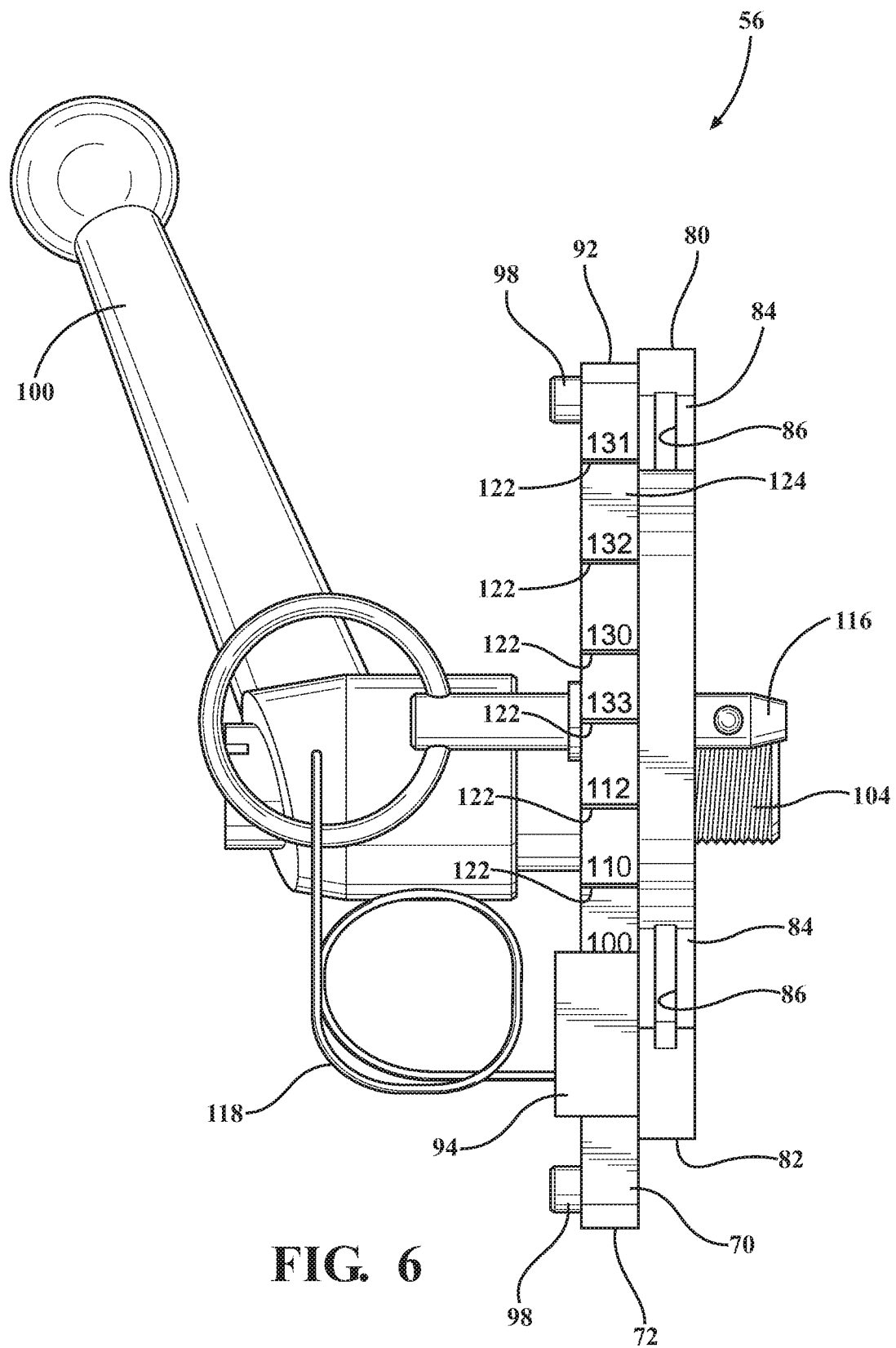
FIG. 6 is side view of the rail shoe assembly of FIG. 1.

The rail shoe assembly 56 may additionally include a clamp 100 for tightening the base 68 to the drill 50. In one embodiment, the base 68 defines an opening 102, as best shown in FIG. 8, and the support frame defines an aperture 103, as best shown in FIG. 3. The clamp 100 has a protrusion 104, as best shown in FIG. 5, extending through the opening 102 and the aperture 103 to engage the drill 50. In one embodiment, the clamp 100 is a KIPP® clamp with the protrusion 104 having external for engaging the drill 50, which is configured to receive the protrusion 104. It is to be appreciated that the clamp 100 may be any other suitable design for attaching the base 68, such as internal threads, and is not limited to the specific configuration shown throughout the Figures.

Figure 11:
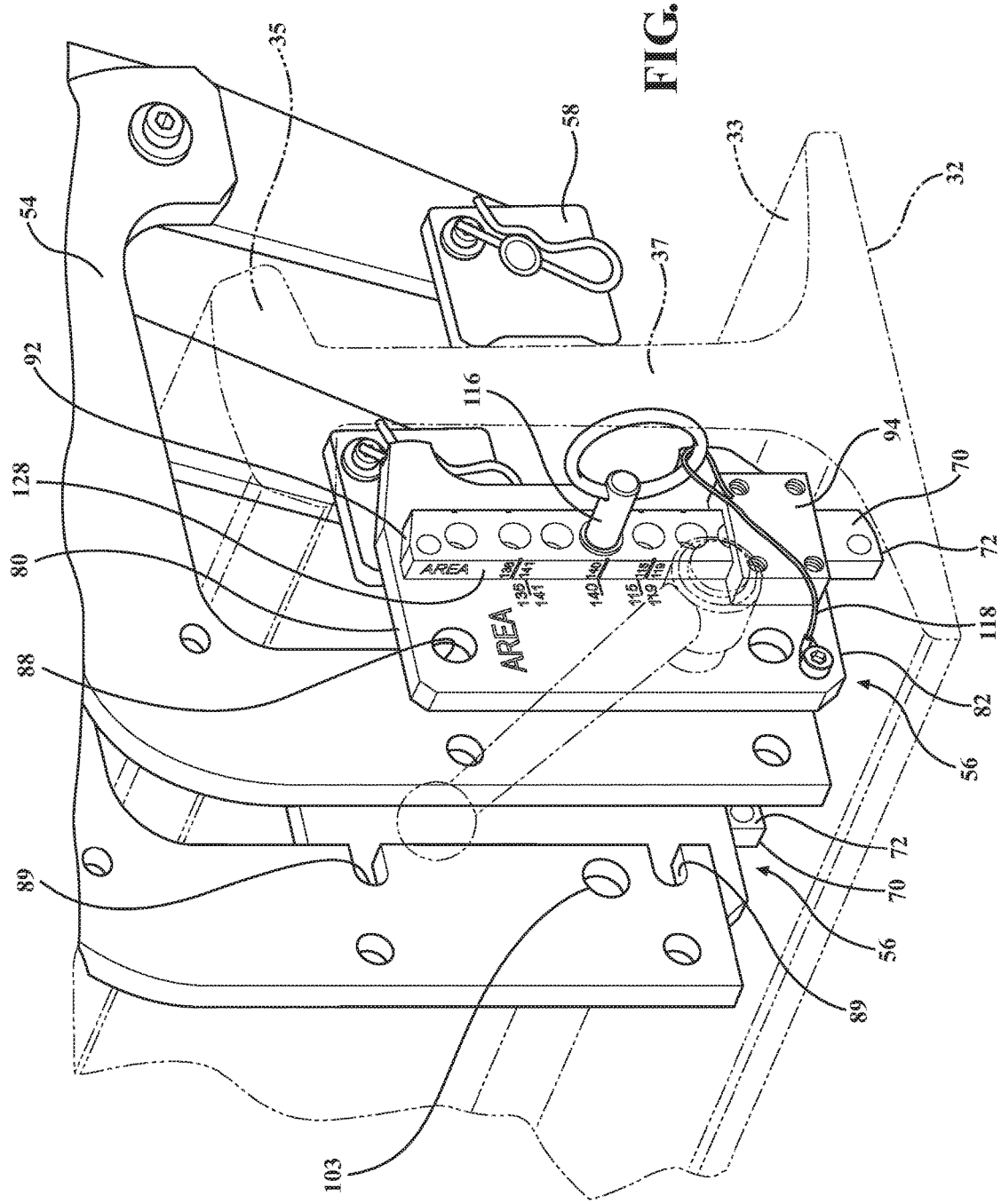
FIG. 11 is a left perspective view of the rail, the frame, and the rail shoe assembly of FIG. 1 with the adjustable bar in the first position with respect to the base.

As mentioned above, the plurality of position indicators 78 and the plurality of mounting chambers 76 are alignable at the predetermined position. As shown in FIGS. 9 through 11, the adjustable bar 70 is in the predetermined position with respect to the base 68. It is to be appreciated that the predetermined position of the adjustable bar 70 with respect to the base 68 may be different than illustrated throughout the Figures, as described in further detail below. When the adjustable bar 70 is in the predetermined position with respect to the base 68 and the rail shoe assembly 56 is mounted to the rail 32, the bottom edge 72 engages the foot 33 of the rail 32 such that the base 68 is spaced from the foot 33 of the rail 32. When the rail shoe assembly 56 is coupled to the support frame 54 and both the rail shoe assembly 56 and the support frame are mounted to the drill 50, the cutter 52 is positioned adjacent the web 37 and between the foot 33 and the head 35 of the rail 32. In other words, the position of the adjustable bar 70 with respect to the base 68 determines the position of the cutter 52 with respect to the foot 33, the web 37, the head 35, and the base 68. As such, the rail shoe assembly 56 helps to consistently position the cutter 52 with respect to the foot 33, the head 35, and the web 37 of the rail 32 for drilling a hole. As described in further detail below, the position of the cutter 52 with respect to the web 37, the head 35, and the foot 33 of the rail 32 prior to drilling is determined by different standards of the rail industry.

Figure 12:
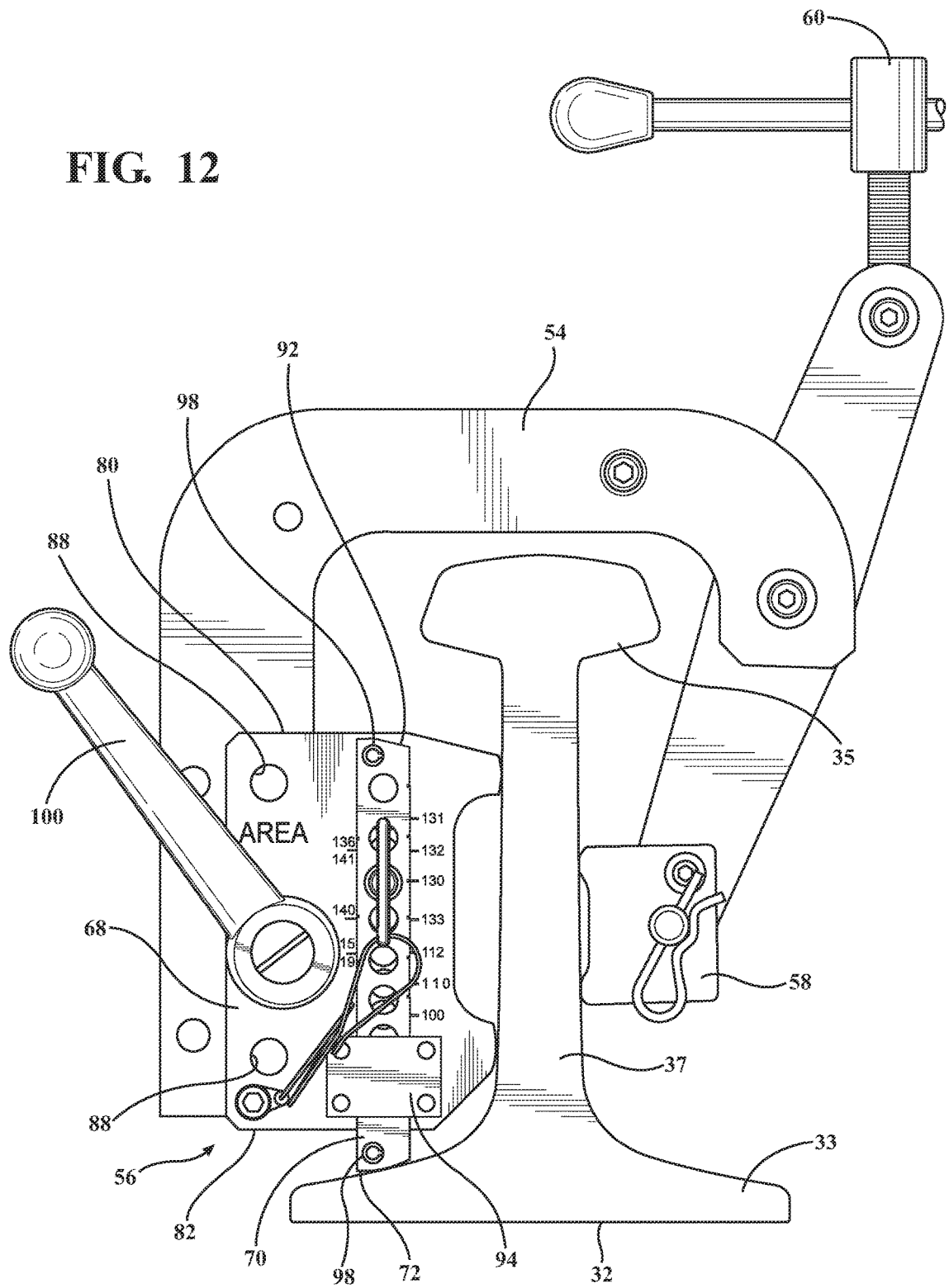
FIG. 12 is a side view of the rail, the frame, and the rail shoe of FIG. 1 with the adjustable bar in a second position with respect to the base.
Figure 13:
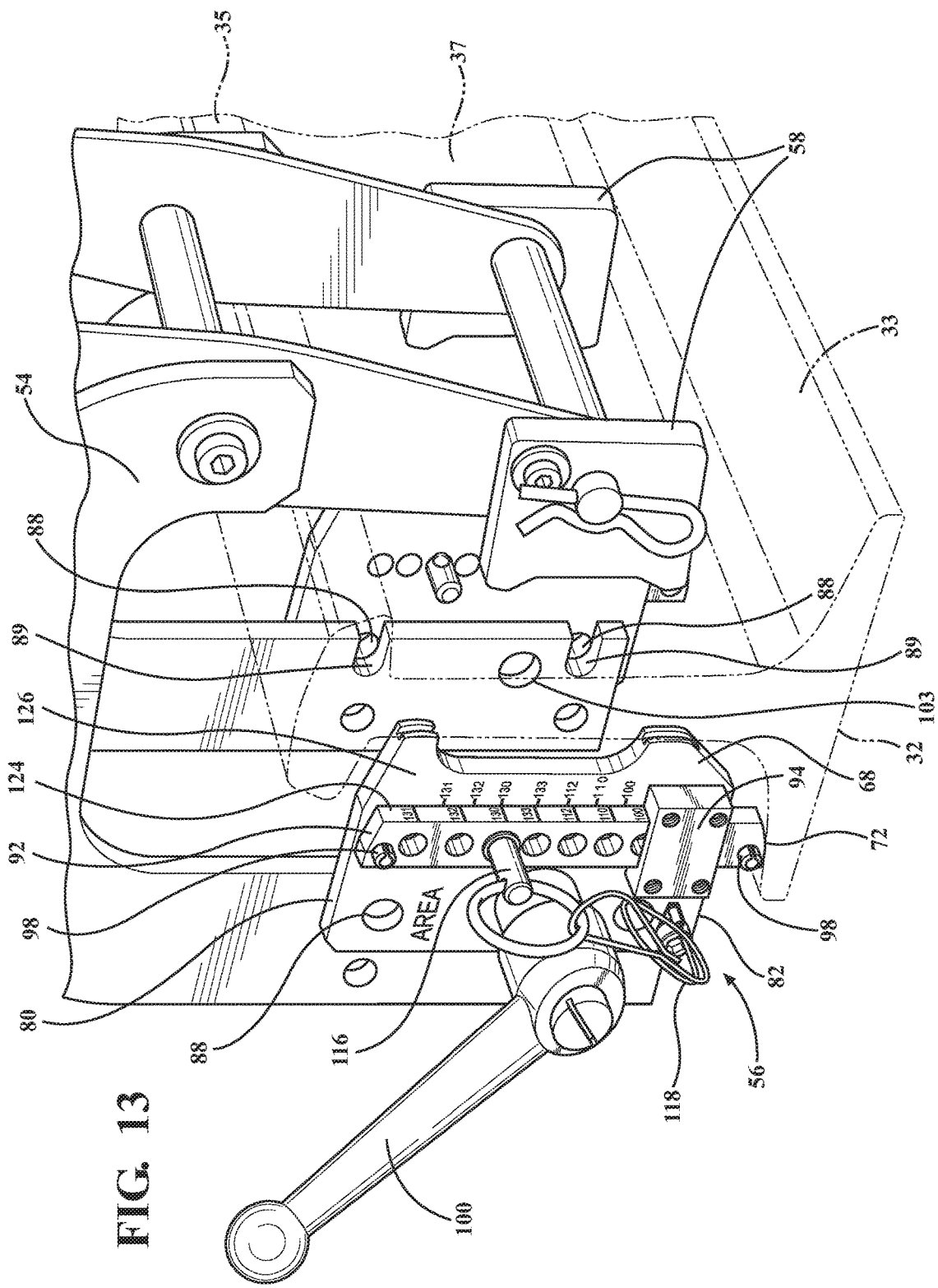
FIG. 13 is a perspective view of the rail, the frame, and the rail shoe of FIG. 1 with the adjustable bar in the second position with respect to the base.

In one embodiment, the plurality of position indicators 78 and the plurality of mounting chambers 76 are alignable at two predetermined positions. In this embodiment, the predetermined position described above is further defined as a first predetermined position such that the adjustable bar 70 is alignable at the first predetermined position, and a second predetermined position different from the first predetermined position with respect to the base 68. By way of example, the first predetermined position is shown in FIGS. 9-11 and the second predetermined position is shown in FIGS. 12 and 13. With reference to FIGS. 9 and 12, the bottom edge 72 of the adjustable bar 70 moves toward the bottom surface 82 of the base 68 to be in the second predetermined position. When the adjustable bar 70 moves toward the bottom surface 82 of the base 68 to be in the second predetermined position, a distance defined between the bottom edge 72 of the base 68 and the foot 33 of the rail decreases. As such, when the drilling machine 30 is positioned with respect to the rail 32, the adjustable bar 70 and the base 68 engage the rail 32, and the cutter 52 is positioned relative to the web 37 of the rail 32. When the adjustable bar 70 is in the second predetermined position, the cutter 52 is located closer to the foot 33 of the rail 32 with respect to the web 37 than when the cutter 52 is in the first predetermined position described above.

Figure 14:
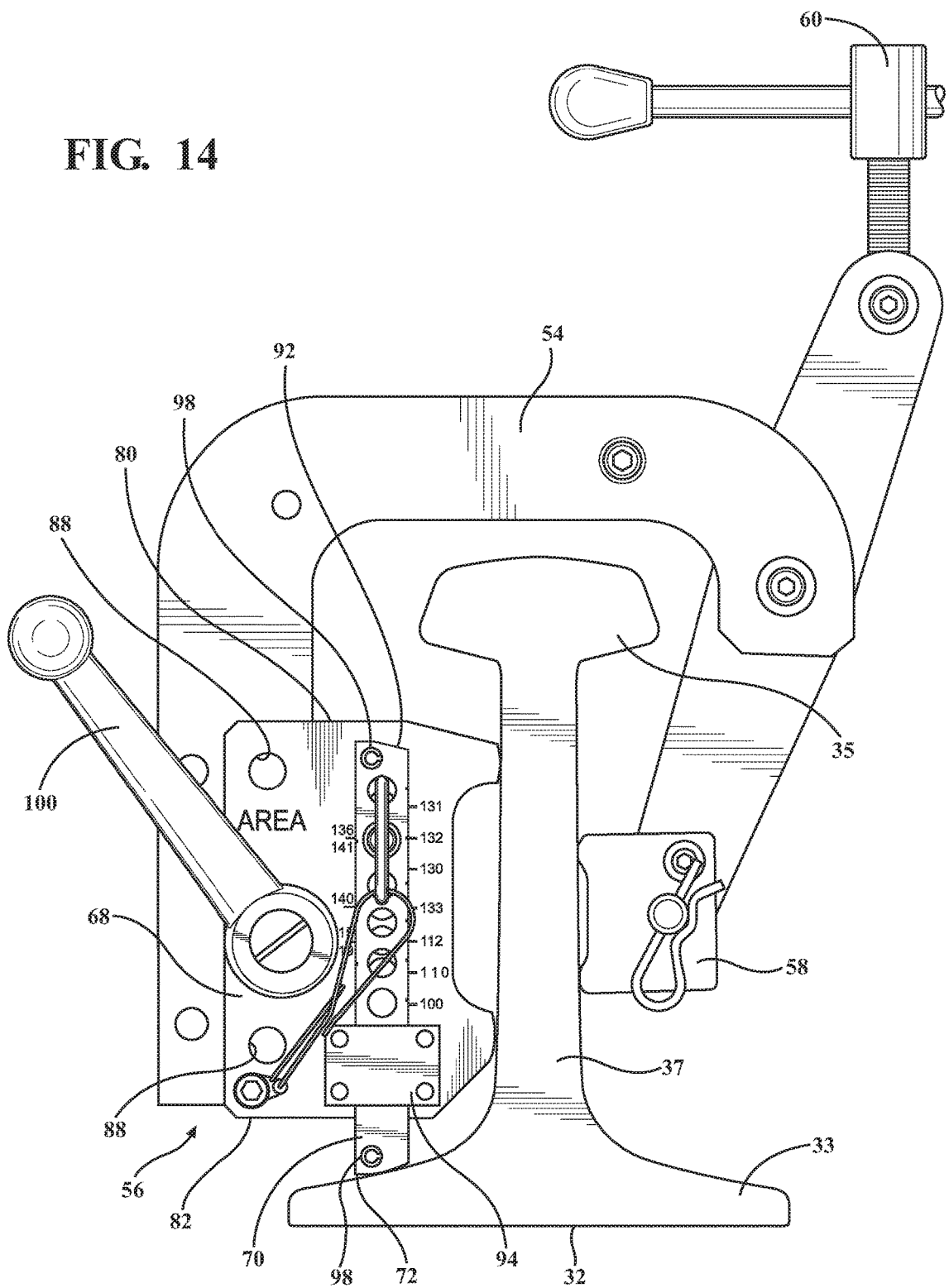
FIG. 14 is a side view of the rail, the frame, and the rail shoe of FIG. 1 with the adjustable bar in a third position with respect to the base.
Figure 15:
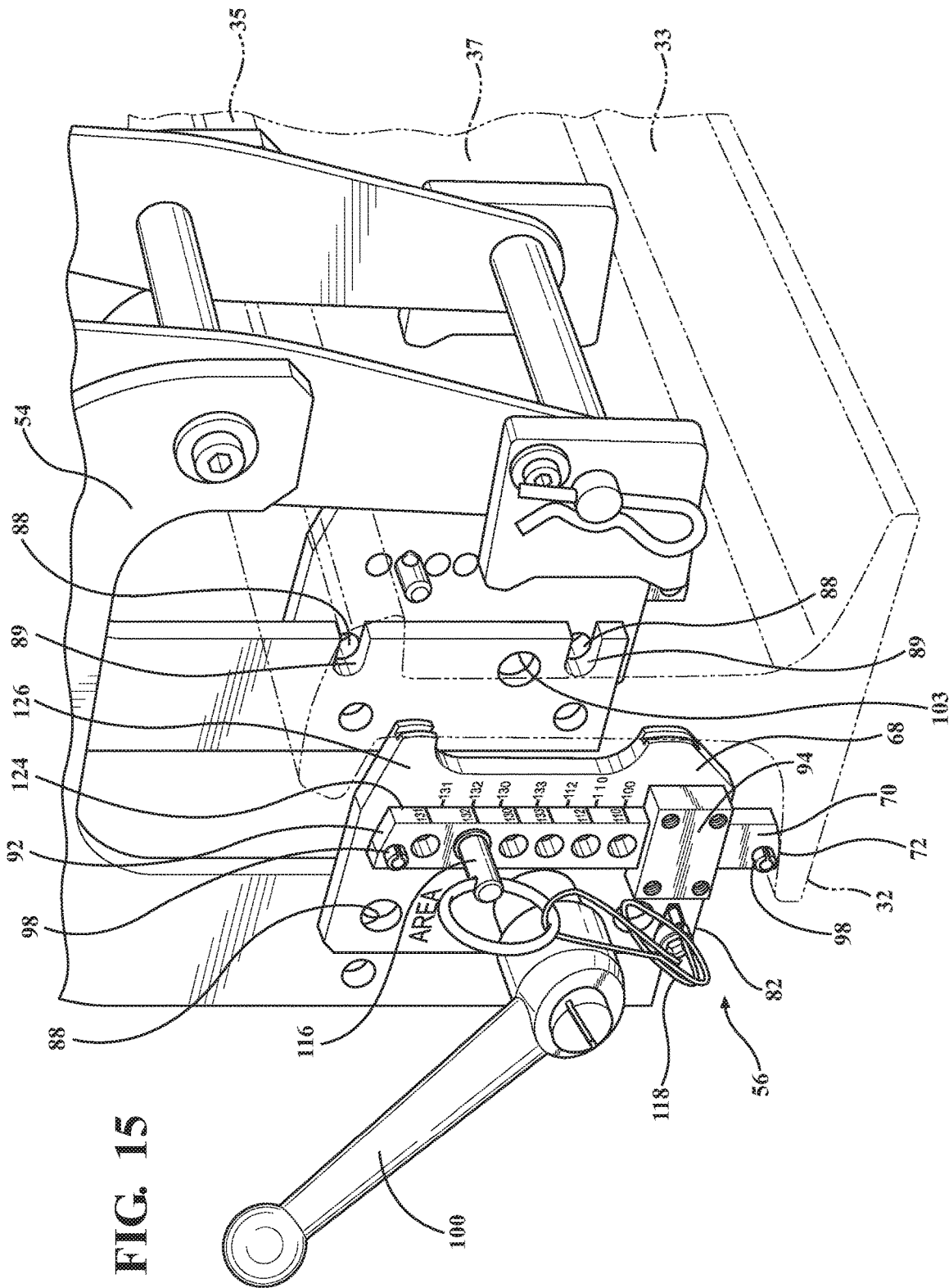
FIG. 15 is a right perspective view of the rail, the frame, and the rail shoe of FIG. 1 with the adjustable bar in the third position with respect to the base.
Figure 16:
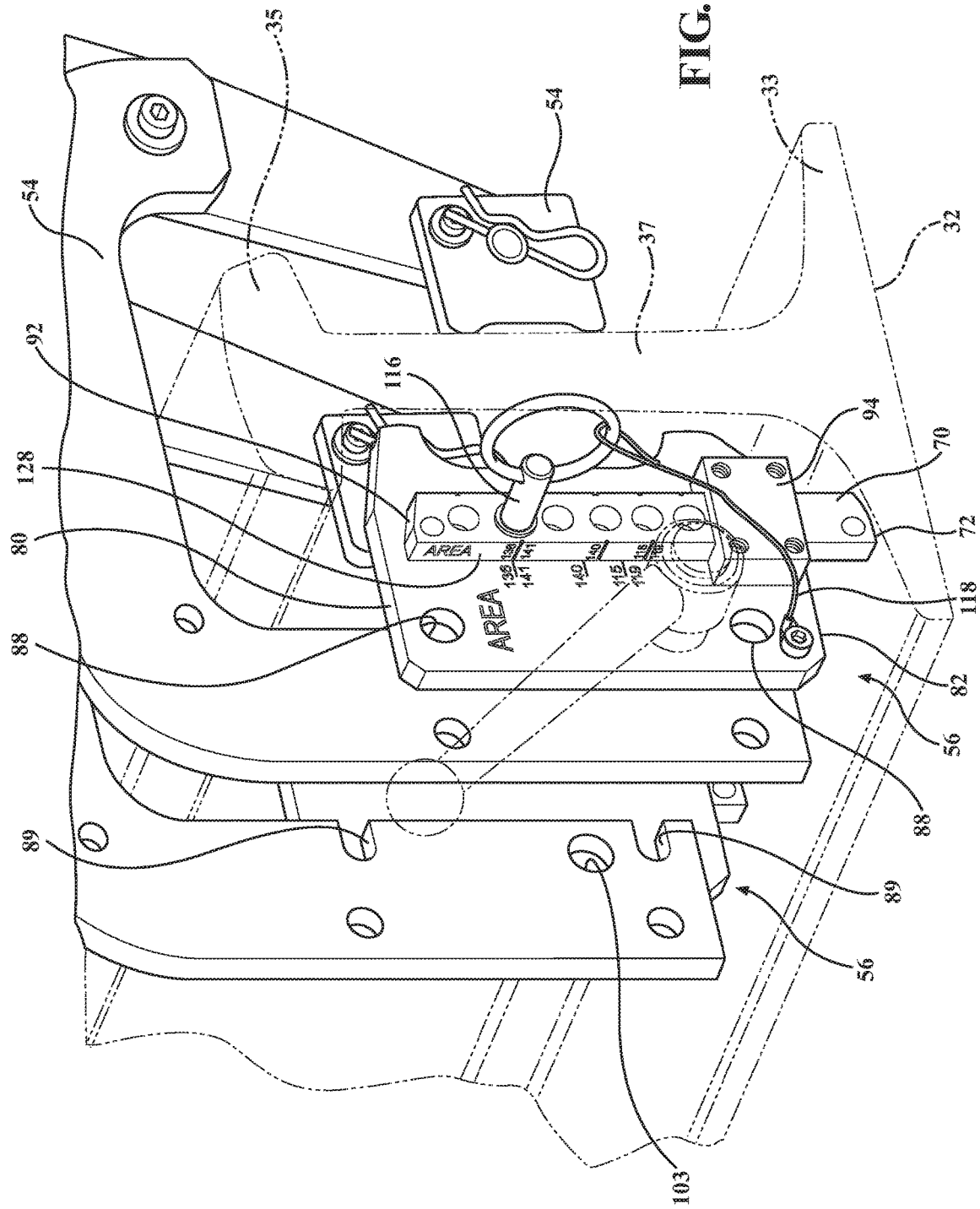
FIG. 16 is a left perspective view of the rail, the frame, and the rail shoe of FIG. 1 with the adjustable bar in the third position with respect to the base.

In another embodiment, the plurality of position indicators 78 and the plurality of mounting chambers 76 are alignable at three predetermined positions. In this embodiment, the adjustable bar 70 is alignable at the first predetermined position and the second predetermined position, along with a third predetermined position with respect to the base 68. By way of example, in this embodiment, the first predetermined position is shown in FIGS. 9-11, the second predetermined position is shown in FIGS. 12 and 13, and the third predetermined position is shown in FIGS. 14-16. With reference to FIGS. 12 and 14, the bottom edge 72 of the adjustable bar 70 moves away from the bottom surface 82 of the base 68 to be in the third predetermined position. When the bottom edge 72 of the adjustable bar 70 moves away from the bottom surface 82 of the base 68 to be in the third predetermined position, a distance defined between the bottom surface 82 of the base 68 and the foot 33 of the rail 32 increases. As such, when the drilling machine 30 is positioned with respect to the rail 32, the adjustable bar 70 and the base 68 engage the rail 32, and the cutter 52 is positioned relative to the web 37 of the rail 32. When the adjustable bar 70 is in the third predetermined position, the cutter 52 is located further away from the foot 33 of the rail 32 with respect to the web 37 than when the cutter 52 is in the second predetermined position described above.

Figure 17:
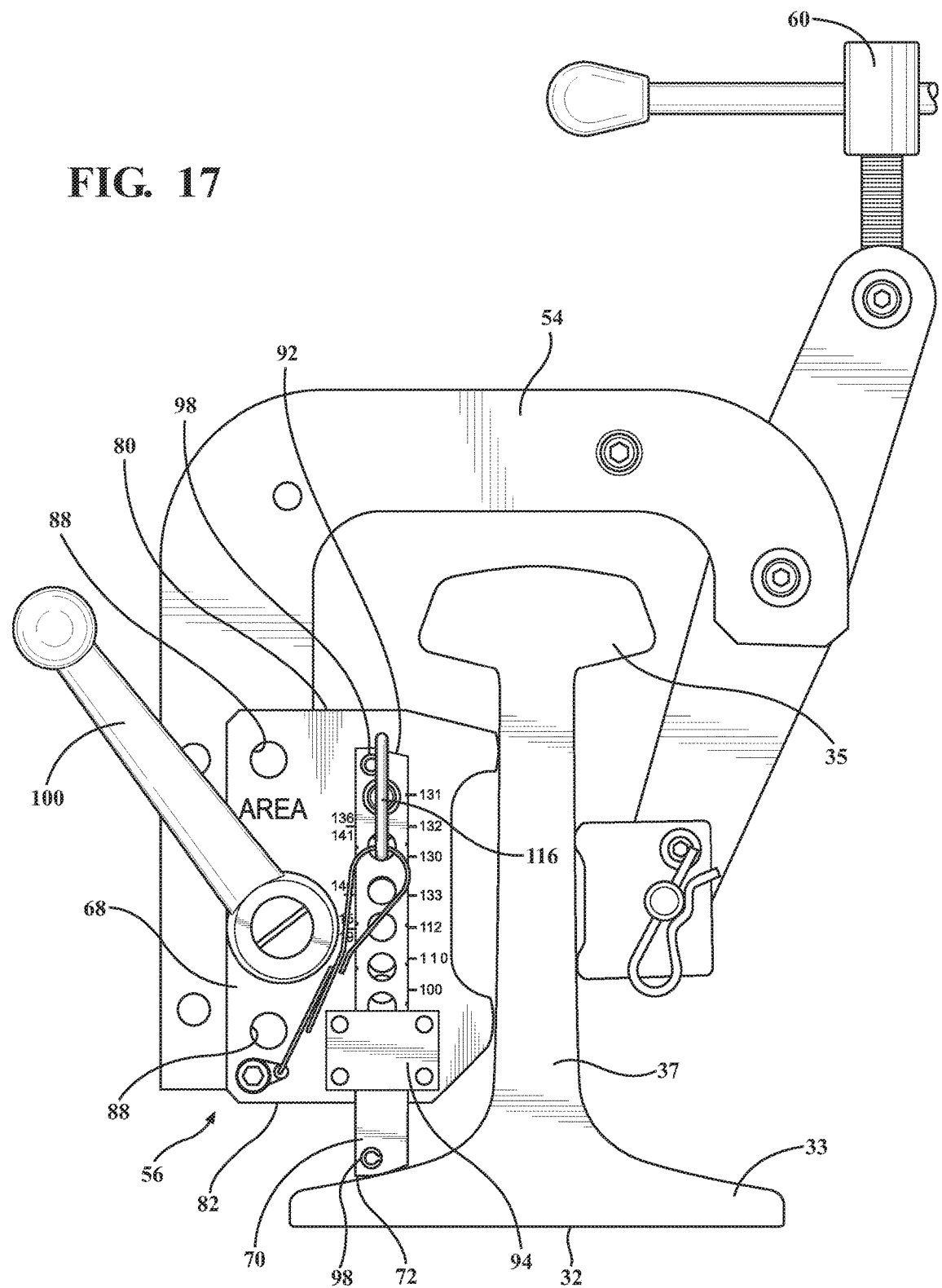
FIG. 17 is a side view of the rail, the frame, and the rail shoe of FIG. 1 with the adjustable bar in a fourth position with respect to the base.
Figure 18:
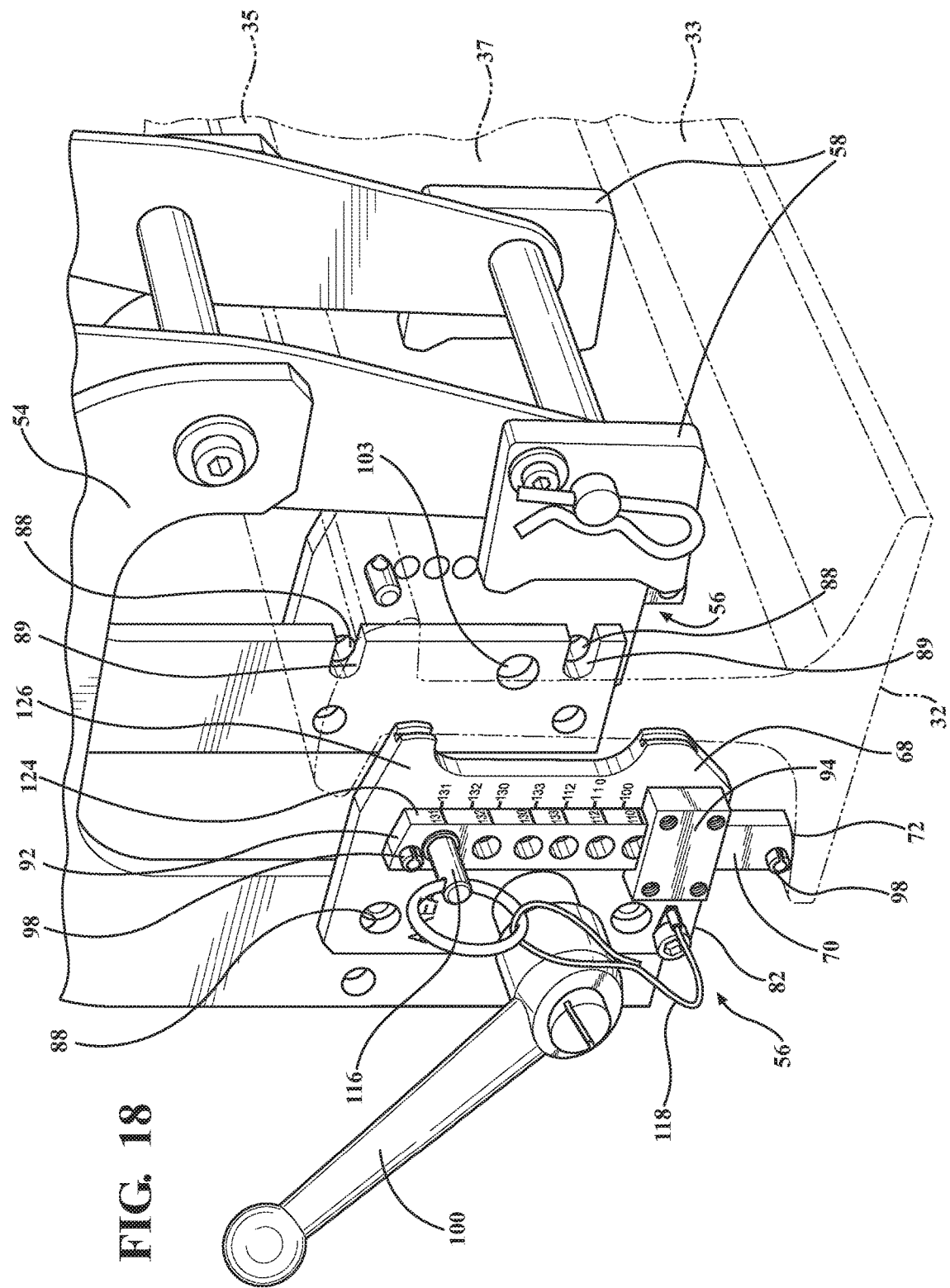
FIG. 18 is a perspective view of the rail, the frame, and the rail shoe of FIG. 1 with the adjustable bar in the fourth position with respect to the base.

In another embodiment, the plurality of position indicators 78 and the plurality of mounting chambers 76 are alignable at four predetermined positions. In this embodiment, the adjustable bar 70 is alignable at the first predetermined position, the second predetermined position, and the third predetermined position, along with a fourth predetermined position with respect to the base 68. By way of example, in this embodiment, the first predetermined position is shown in FIGS. 9-11, the second predetermined position is shown in FIGS. 12 and 13, the third predetermined position is shown in FIGS. 14-16, and the fourth predetermined position is shown in FIGS. 17 and 18. With reference to FIGS. 14 and 17, the bottom edge of the adjustable bar 70 moves away from the bottom surface 82 of the base 68 to be in the fourth predetermined position. When the adjustable bar 70 moves away from the bottom surface 82 of the base 68 to be in the fourth predetermined position, a distance defined between the bottom surface 82 of the base 68 and the foot 33 of the rail 32 increases. As such, when the drilling machine 30 is positioned with respect to the rail 32, the adjustable bar 70 and the base 68 engage the rail 32, and the cutter 52 is positioned relative to the web 37 of the rail 32. When the adjustable bar 70 is in the fourth predetermined position, the cutter 52 is located further away from the foot 33 of the rail 32 with respect to the web 37 than when the cutter 52 is in the third predetermined position described above.

Figure 19:
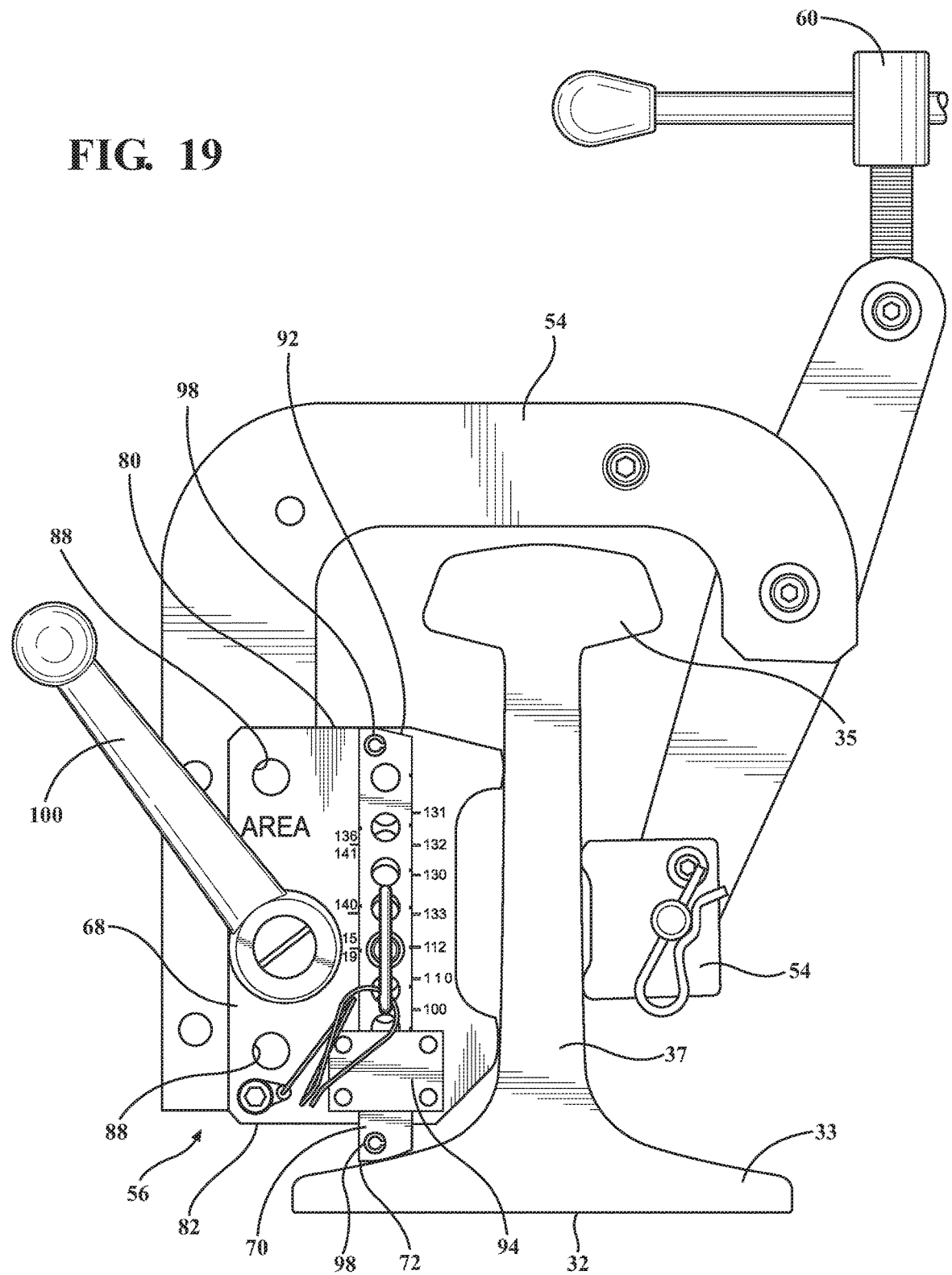
FIG. 19 is a side view of the rail, the frame, and the rail shoe of FIG. 1 with the adjustable bar in a fifth position with respect to the base.
Figure 20:
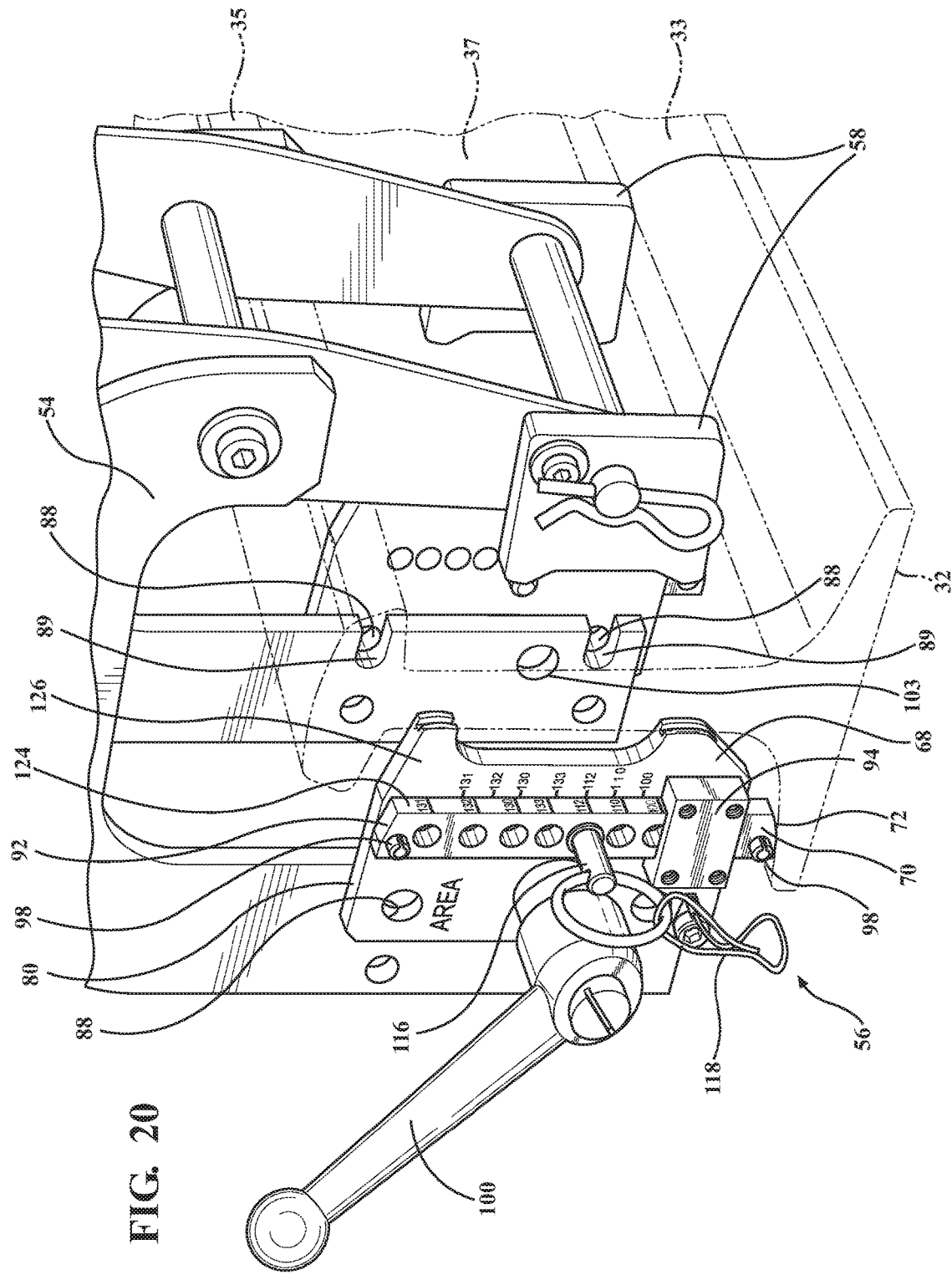
FIG. 20 is a right perspective view of the rail, the frame, and the rail shoe of FIG. 1 with the adjustable bar in the fifth position with respect to the base.
Figure 21:
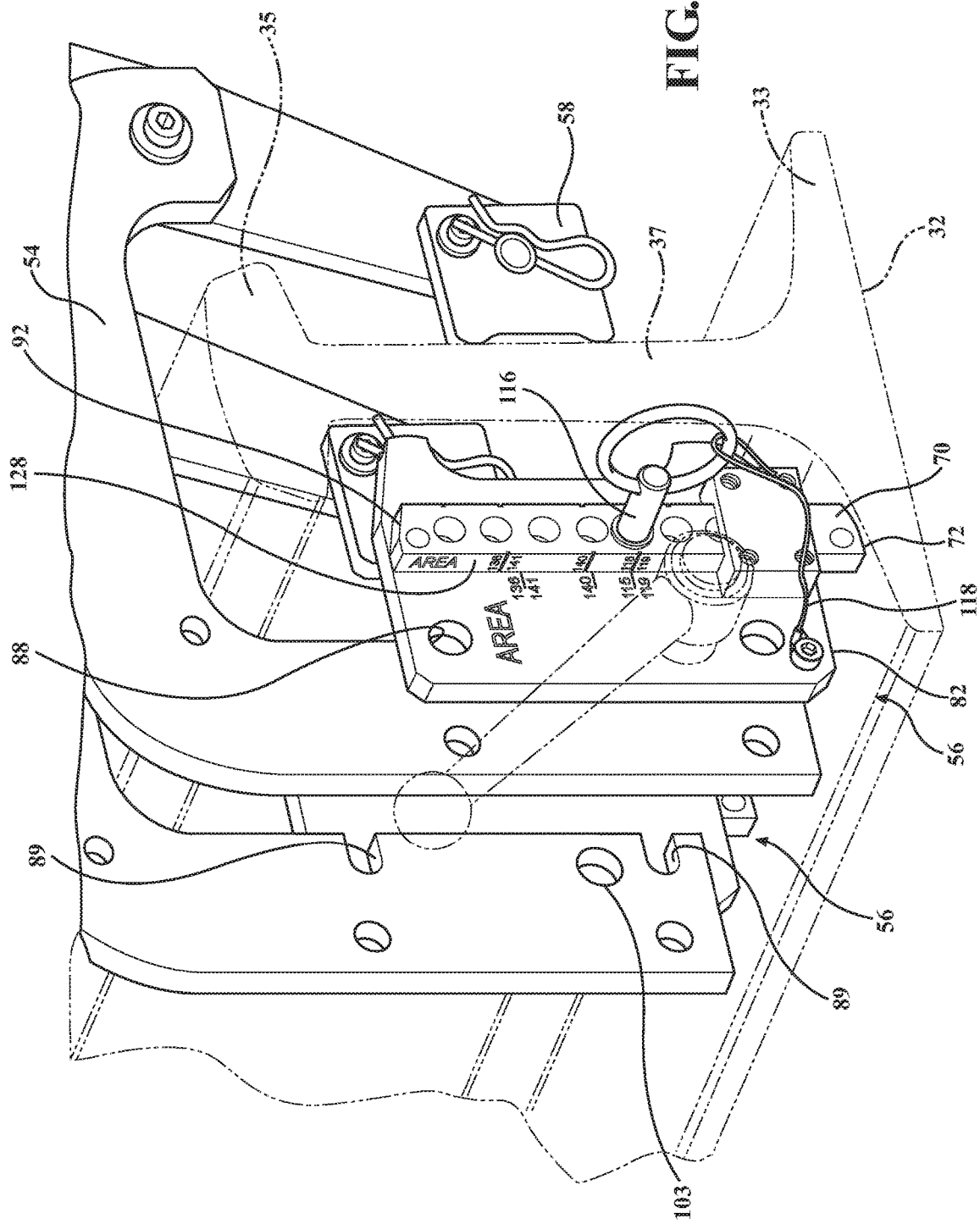
FIG. 21 is a left perspective view of the rail, the frame, and the rail shoe of FIG. 1 with the adjustable bar in the fifth position with respect to the base.

In another embodiment, the plurality of position indicators 78 and the plurality of mounting chambers 76 are alignable at five predetermined positions. In this embodiment, the adjustable bar 70 is alignable at the first predetermined position, the second predetermined position, the third predetermined position, and the fourth predetermined position, along with a fifth predetermined position with respect to the base 68. By way of example, in this embodiment, the first predetermined position is shown in FIGS. 9-11, the second predetermined position is shown in FIGS. 12 and 13, the third predetermined position is shown in FIGS. 14-16, the fourth predetermined position is shown in FIGS. 17 and 18, and the fifth predetermined position is shown in FIGS. 19-21. As best shown in FIGS. 9 and 19, the bottom edge 72 of the adjustable bar 70 moves toward the bottom surface 82 of the base 68 to be in the fifth predetermined position. When the bottom edge 72 of the adjustable bar 70 moves toward the bottom surface 82 of the base 68 to be in the fifth predetermined position, a distance defined between the bottom surface 82 of the base 68 and the foot 33 of the rail 32 decreases. As such, when the drilling machine 30 is positioned with respect to the rail 32, the adjustable bar 70 and the base 68 engage the rail 32, and the cutter 52 is positioned relative to the web 37 of the rail 32. When the adjustable bar 70 is in the fifth predetermined position, the cutter 52 is located closer to the foot 33 of the rail 32 with respect to the web 37 than when the cutter 52 is in the first predetermined position described above.

Figure 22:
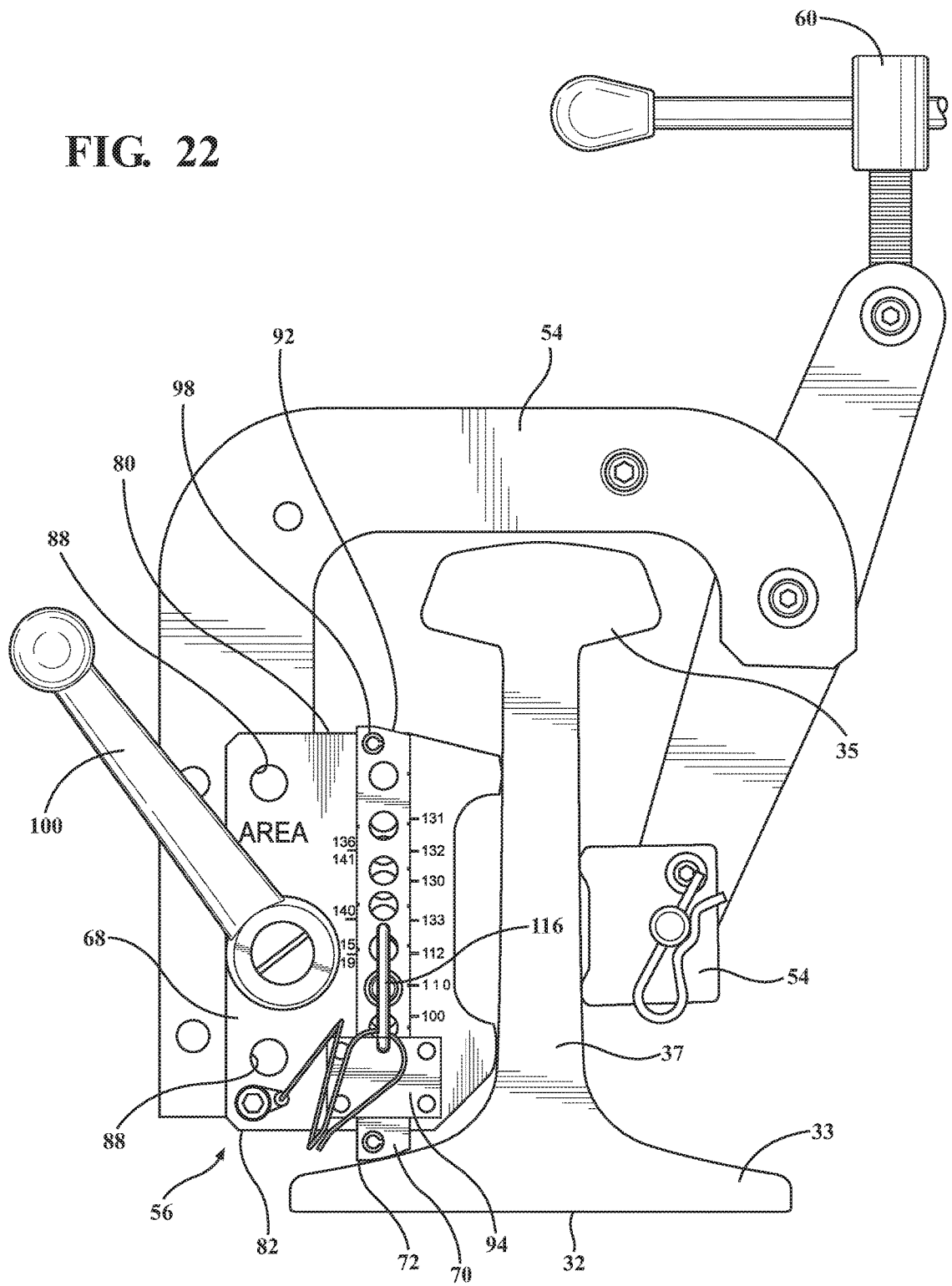
FIG. 22 is a side view of the rail, the frame, and the rail shoe of FIG. 1 with the adjustable bar in a sixth position with respect to the base.
Figure 23:
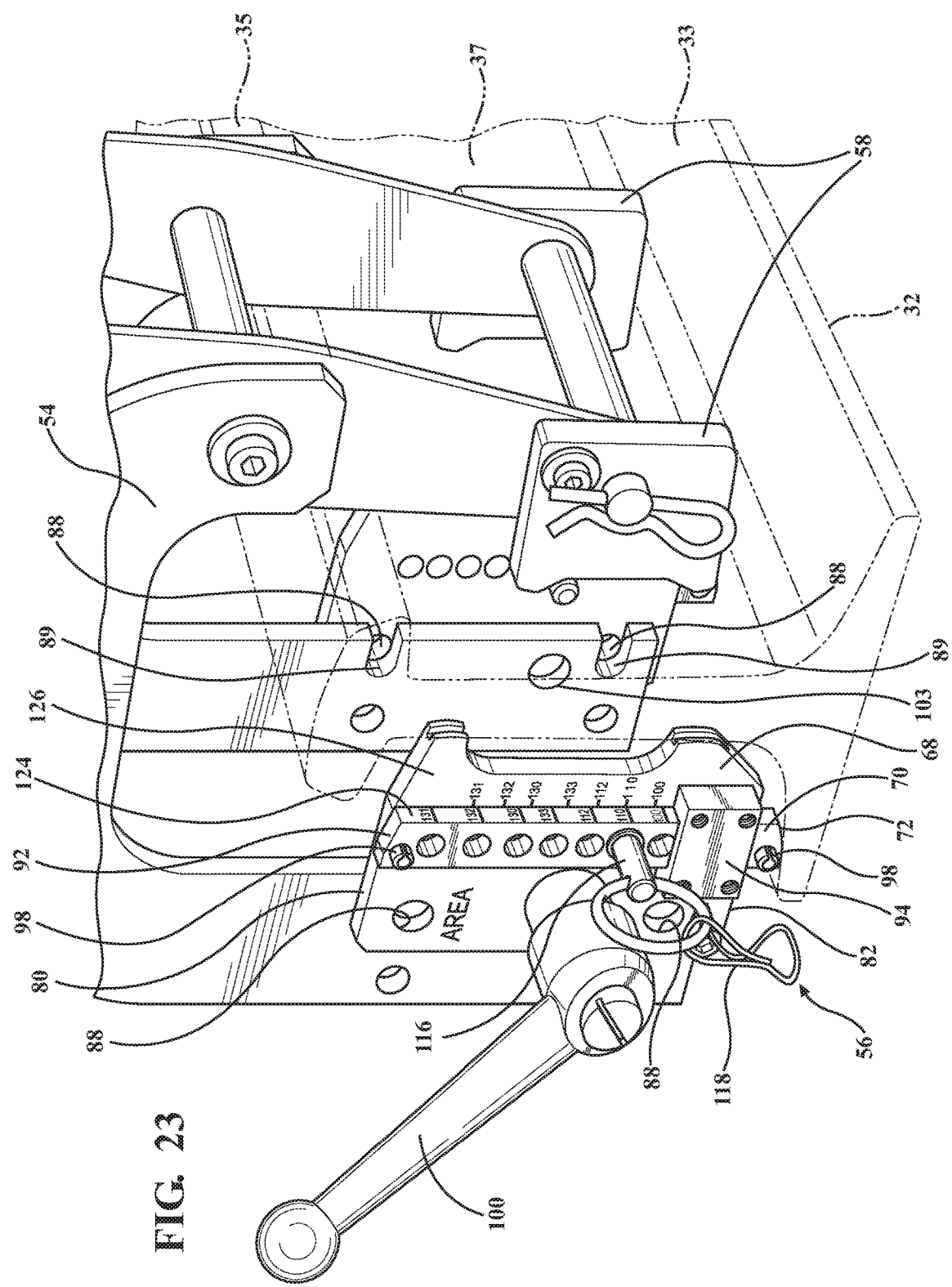
FIG. 23 is a perspective view of the rail, the frame, and the rail shoe of FIG. 1 with the adjustable bar in the sixth position with respect to the base.

In another embodiment, the plurality of position indicators 78 and the plurality of mounting chambers 76 are alignable at six predetermined positions. In this embodiment, the adjustable bar 70 is alignable at the first predetermined position, the second predetermined position, the third predetermined position, the fourth predetermined position, and the fifth predetermined position, along with a sixth predetermined position with respect to the base 68. By way of example, in this embodiment, the first predetermined position is shown in FIGS. 9-11, the second predetermined position is shown in FIGS. 12 and 13, the third predetermined position is shown in FIGS. 14-16, the fourth predetermined position is shown in FIGS. 17 and 18, the fifth predetermined position is shown in FIGS. 19-21, and the sixth predetermined position is shown in FIGS. 22 and 23. With reference to FIGS. 19 and 22, the bottom edge 72 of the adjustable bar 70 moves toward the bottom surface 82 of the base 68 to be in the sixth predetermined position. When the bottom edge 72 of the adjustable bar 70 moves toward the bottom surface 82 of the base 68 to be in the sixth predetermined position, a distance defined between the bottom surface 82 of the base 68 and the foot 33 of the rail 32 decreases. As such, when the drilling machine 30 is positioned with respect to the rail 32, the adjustable bar 70 and the base 68 engage the rail 32, and the cutter 52 is positioned relative to the web 37 of the rail 32. When the adjustable bar 70 is in the sixth predetermined position, the cutter 52 is located closer to the foot 33 of the rail 32 with respect to the web 37 than when the cutter 52 is in the fifth predetermined position described above.

Figure 24:
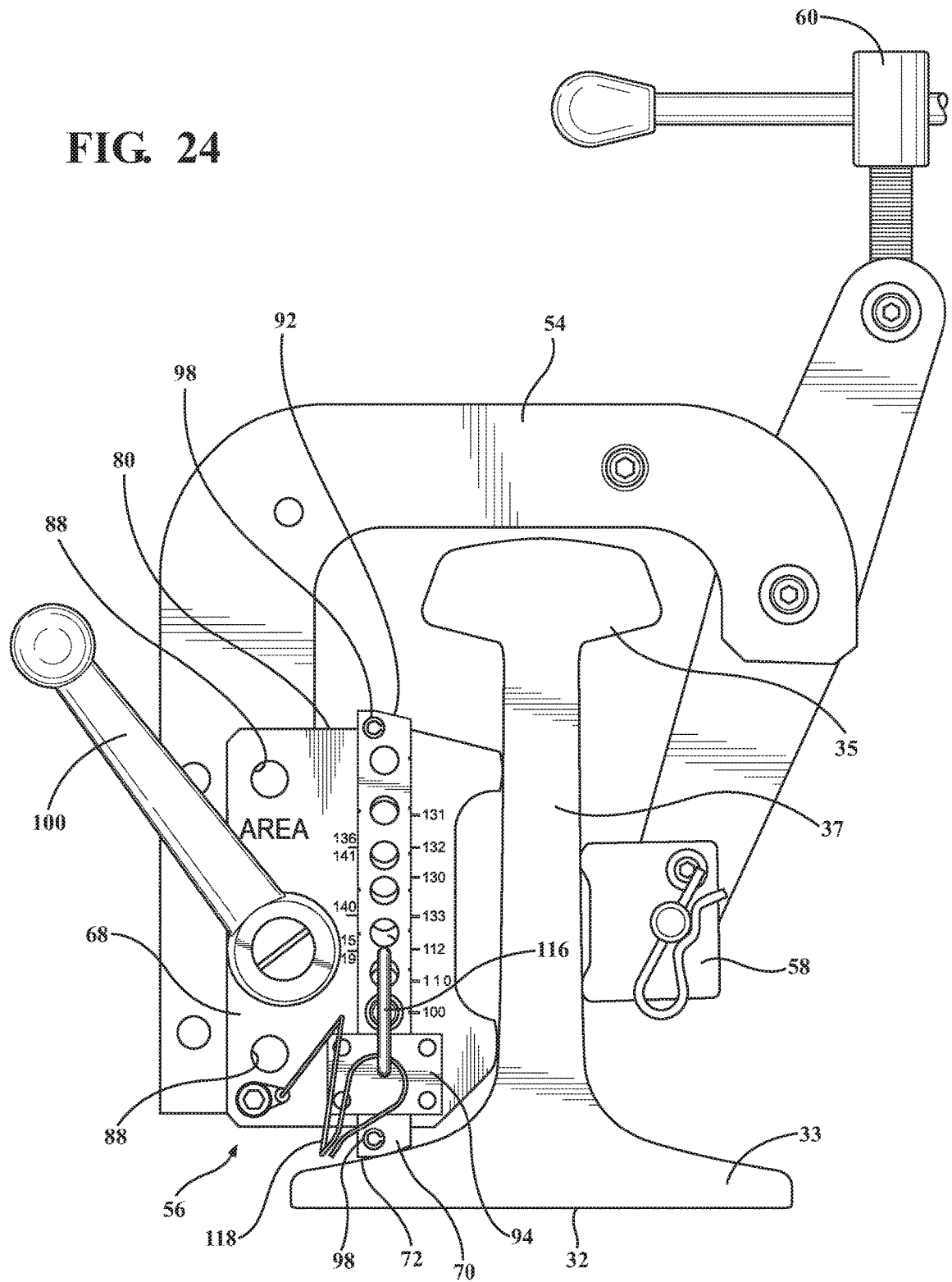
FIG. 24 is a side view of the rail, the frame, and the rail shoe of FIG. 1 with the adjustable bar in a seventh position with respect to the base.
Figure 25:
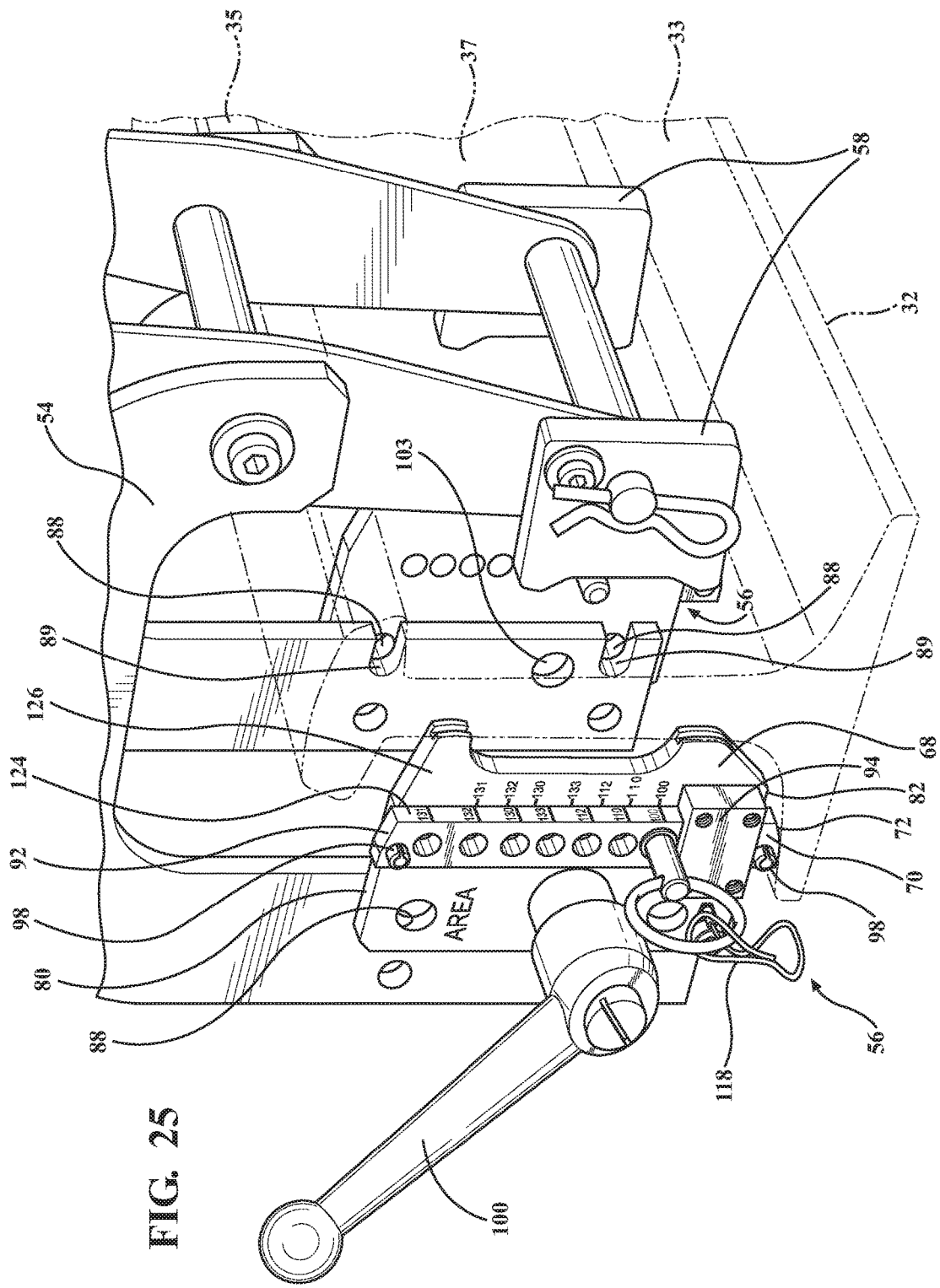
FIG. 25 is a perspective view of the rail, the frame, and the rail shoe of FIG. 1 with the adjustable bar in the seventh position with respect to the base.

In another embodiment, the plurality of position indicators 78 and the plurality of mounting chambers 76 are alignable at seven predetermined positions. In this embodiment, the adjustable bar 70 is alignable at the first predetermined position, the second predetermined position, the third predetermined position, the fourth predetermined position, the fifth predetermined position, and the sixth predetermined position, along with a seventh predetermined position with respect to the base 68. By way of example, in this embodiment, the first predetermined position is shown in FIGS. 9-11, the second predetermined position is shown in FIGS. 12 and 13, the third predetermined position is shown in FIGS. 14-16, the fourth predetermined position is shown in FIGS. 17 and 18, the fifth predetermined position is shown in FIGS. 19-21, the sixth predetermined position is shown in FIGS. 22 and 23, and the seventh predetermined position is shown in FIGS. 24 and 25. As shown in FIGS. 22 and 24, the bottom edge 72 of the adjustable bar 70 moves toward the bottom surface 82 of the base 68 to be in the seventh predetermined position. When the bottom edge 72 of the adjustable bar 70 moves toward the bottom surface 82 of the base 68 to be in the seventh predetermined position, a distance defined between the bottom surface 82 of the base 68 and the foot 33 of the rail 32 decreases. As such, when the drilling machine 30 is positioned with respect to the rail 32, the adjustable bar 70 and the base 68 engage the rail 32, and the cutter 52 is positioned relative to the web 37 of the rail 32. When the adjustable bar 70 is in the seventh predetermined position, the cutter 52 is located closer to the foot 33 of the rail 32 with respect to the web 37 than when the cutter 52 is in the sixth predetermined position described above.

With reference to FIG. 7, the plurality of mounting chambers 76 each define a chamber length 106 between one another. Typically, the chamber length 106 is equidistant between each of the mounting chambers 76. In other embodiments, the chamber length 106 may be different between each of the mounting chambers 76.

With reference to FIG. 8, the plurality of position indicators 78 define an indicator length 108 between one another. Typically, the indicator length 108 is different from the chamber length 106. In other words, when the adjustable bar 70 is slideably coupled to the base 68, the plurality of position indicators 78 are offset with respect to the plurality of mounting chambers 76 when the adjustable bar 70 is in the predetermined position. The adjustable bar 70, to align at the second predetermined position or the third predetermined position from the first predetermined position, moves with respect to the base 68. For example, when moving the adjustable bar 70 from the first predetermined position to the second predetermined position, the adjustable bar 70 moves a first distance with respect to the base 68 with the first distance equal to a first indicator length 110. When moving the adjustable bar 70 from the second predetermined position to the third predetermined position, the adjustable bar 70 moves a second distance with respect to the base 68 with the second distance equal to a second indicator length 112. In one embodiment, the first distance and the second distance are different from one another, i.e., not equidistant. It is to be appreciated that the first and second distances may be equal to one another, i.e., equidistant, without departing from the nature of the present invention. When moving the adjustable bar 70 moves from the third predetermined position to the fourth predetermined position, the adjustable bar 70 moves a third distance with respect to the base 68 equal to a third indicator length 114 different from the first indicator length 110 and the second indicator length 112. It is to be appreciated that the indicator distance defined between each of the plurality of position indicators 78 may change depending on the rail profile. It is also to be appreciated that each of the plurality of position indicators 78 define an indicator length 108 between one another and that the indicator length 108 may vary or be equal to one another between each plurality of position indicators 78.

Typically, one of the plurality of position indicators 78 and one of the plurality of mounting chambers 76 align at the predetermined position. Although this is typically the case when the plurality of position indicators 78 and the plurality of mounting chambers 76 are offset from one another, it is to be appreciated that indicator length 108 and the mounting chamber length 106 may be equal to one another with only one of the plurality of position indicators 78 and one of the plurality of mounting chambers 76 being alignable at one time without departing from the nature of the present invention. It is also to be appreciated that two or more of the plurality of position indicators 78 and the plurality of mounting chambers 76 may align at the predetermined position without departing from the nature of the present invention, as described in further detail below.

The rail shoe assembly 56 may also include a pin 116 engageable with the base 68 and the adjustable bar 70. The pin 116 is adapted to fix and/or align the adjustable bar 70 and the base 68 relative to one another in the predetermined position. The pin 116 may be disposed between the adjustable bar 70 and the base 68 for fixing the adjustable bar 70 with respect to the base 68. The pin 116 may be fixed to the base 68 such that the adjustable bar 70 moves with respect to the base 68 and the pin 116 selectively engages the adjustable bar 70 for aligning the plurality of mounting chambers 76 and the plurality of position indicators 78 in the predetermined position. The pin 116 may be fixed to the adjustable bar 70 such that the adjustable bar 70 moves with respect to the base 68 and the pin 116 selectively engages the base 68 for aligning the plurality of mounting chambers 76 and the plurality of position indicators 78 at the predetermined position. Other embodiments of the pin 116 will be described in further detail below.

In one embodiment, the plurality of mounting chambers 76 are partially defined through the base 68. In this embodiment, the plurality of mounting chambers 76 may be fully defined through the base 68. The plurality of position indicators 78 may be partially defined through the adjustable bar 70. The plurality of position indicators 78 may be fully defined through the adjustable bar 70. In this embodiment, the rail shoe assembly 56 may include the pin 116 with the pin 116 being engageable with the base 68 and the adjustable bar 70. Specifically, in this embodiment, the pin 116 is extendable through one of the plurality of position indicators 78 and one of the plurality of mounting chambers 76. As such, the pin 116 is adapted to fix and/or align the adjustable bar 70 and the base 68 relative to one another in the predetermined position.

It is to be appreciated that the plurality of position indicators 78 may be partially or fully defined through the adjustable bar 70 in combination with the plurality of mounting chambers 76 being either partially or fully defined through the base 68. Depending on whether the plurality of position indicators 78 or the plurality of mounting chambers 76 are either partially or fully defined through the adjustable bar 70 or the base 68, respectively, determines where the pin 116 may be located and how the pin 116 engages the adjustable bar 70 and the base 68. For example, if the plurality of mounting chambers 76 are either partially defined or fully defined through the base 68, the pin 116 may be located on the adjustable bar 70 for extending into or through one of the plurality of mounting chambers 76 to fix the adjustable bar 70 to the base 68 in the predetermined position. If the plurality of position indicators 78 are either partially or fully defined through the adjustable bar 70, the pin 116 may be located on the base 68 for extending into or through one of the plurality of mounting chambers 76 to fix the adjustable bar 70 to the base 68 in the predetermined position.

In another embodiment, as best shown in FIG. 10, the pin 116 is removeable from engagement with the adjustable bar 70. In this embodiment, the pin 116 may be fixed to the base 68. To fix the pin 116 to the base 68, the rail shoe assembly 56 may include a cord 118 with the cord 118 fixed to the base 68 and the pin 116 fixed to the cord 118. The cord 118 allows the pin 116 to be fixed to the base 68, but also allows the pin 116 to engage the adjustable bar 70 and the base 68 at one or more predetermined positions. In other words, as shown in FIGS. 18 and 25, the cord 118 has enough slack to allow the pin 116 to engage the base 68 and the adjustable bar 70 in different predetermined positions. Additionally, when the pin 116 is disengaged from the adjustable bar 70 and the base 68, the adjustable bar 70 may move with respect to the base 68 to align the adjustable bar 70 in the predetermined position. When the adjustable bar 70 is aligned in the predetermined position, the pin 116 extends through one of the plurality of position indicators 78 and one of the plurality of mounting chambers 76 to fix the adjustable bar 70 with respect to the base 68.

Figure 4:
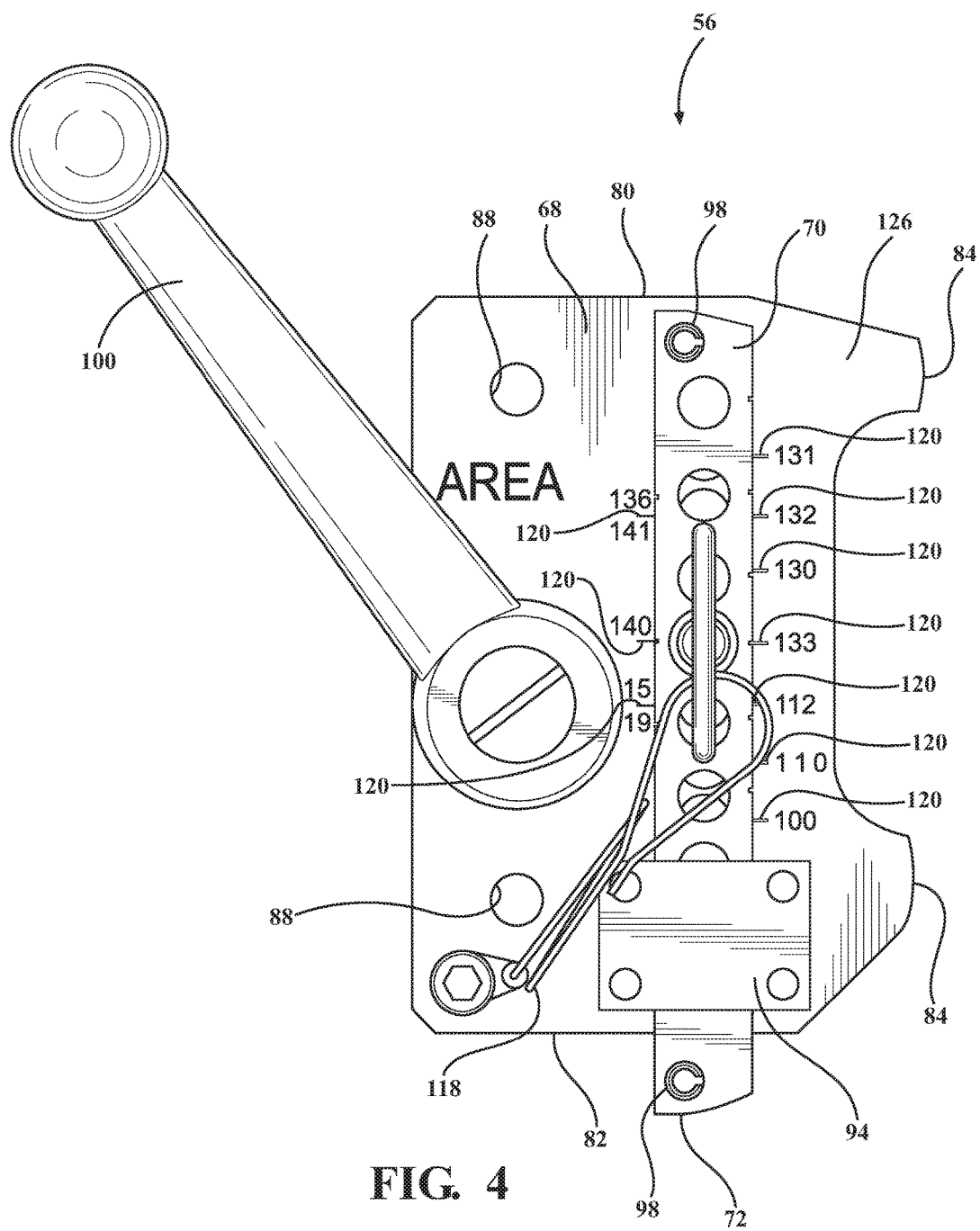
FIG. 4 is front view of the rail shoe assembly of FIG. 1.

As shown throughout the Figures, and with particular reference to FIG. 4, the base 68 may define a plurality of base markings 120 corresponding to the plurality of mounting chambers 76. The plurality of base markings 120 may be defined in the base 68, or may be a line disposed on the base 68. Each of the plurality of base markings 120 typically relate to various standard rail profiles known the in rail industry. For example, the plurality of base markings 120 may correspond to The American Railway Engineering Association (AREA) standard rail profiles for different lb/yd (nominal weight per yard) rail profiles. As best shown in FIGS. 1-4 and 8, the plurality of base markings 120 correspond to various AREA standard rail profiles by nominal weight per yard. As shown, the plurality of base markings 120 may correspond to 131 lb/yd, 132 lb/yd, 130 lb/yd, 133 lb/yd, 112 lb/yd, 110 lb/yd, 100 lb/yd, 136 lb/yd, 141 lb/yd, 140 lb/yd, 115 lb/yd, and 119 lb/yd AREA standard rail profiles. To show the correlation of the plurality of base markings 120 to the AREA standard rail profiles, the base 68 defines numerals adjacent the plurality of base markings 120. As is known in the rail industry and as described above, each different rail profile (lb/yd rating) has different dimensions for the height 36 of the rail 32, the width of the foot 38, the depth of the foot 40, the width of the head 42, the depth of the head 44, the fishing depth (depth defined between the foot 33 and the head 35), and the bolt hole elevation 48. For example, for a 131 lb/yd AREA rail, the height 36 of the rail 32 is 7⅓ inches, the width of the foot 38 is six inches, the depth of the foot 40 is 1 3/16 inches, the width of the head 42 is 3 inches, the depth of the head 44 is 1¾ inches, the fishing depth is 4 3/16 inches, and the bolt hole elevation 48 is 3¼ inches. Dimensions for the height 36 of the rail 32 (HT), width of the foot 38 (BW), depth of the foot 40 (BD), width of the head 42 (HW), depth of the head 44 (HD), fishing depth 46 (FD), and bolt hole elevation 48 (E) for various rail profiles are listed in Tables 1 and 2 below.

TABLE 1

| | | | | | DIMENSIONS IN INCHES | | | | | | | |
|---|---|---|---|---|---|---|---|---|---|---|---|---|
| Nominal Weight Per Yard | Type of Rail | HT (Height) | BW (Width of Base/ Foot) | HW (Width of Head) | W (Web at center point) | HD (Depth of Head) | FD (Fishing) | BD (Depth of Base) | E (Bolt Hole Elevation) | | SECTION DESIGNATION | |
| 12 lb. | ASCE | 2 | 2 | 1 | $3/16$ | $9/16$ | $1^{3}/32$ | $11/32$ | $57/64$ | — | — | — |
| 16 lb. | ASCE | $2^{3}/8$ | $2^{3}/8$ | $1^{11}/64$ | $7/32$ | $41/64$ | $1^{23}/64$ | $3/8$ | $1^{1}/16$ | — | — | — |
| 20 lb. | ASCE | $2^{5}/8$ | $2^{5}/8$ | $1^{11}/32$ | $1/4$ | $23/32$ | $1^{15}/32$ | $7/16$ | $1^{11}/64$ | — | — | — |
| 25 lb. | ASCE | $2^{3}/4$ | $2^{3}/4$ | $1^{1}/2$ | $19/64$ | $25/32$ | $1^{31}/64$ | $31/64$ | $1^{15}/64$ | — | — | — |
| 30 lb. | ASCE | $3^{1}/8$ | $3^{1}/8$ | $1^{11}/16$ | $21/64$ | $7/8$ | $1^{23}/32$ | $17/32$ | $1^{25}/64$ | — | — | — |
| 35 lb. | ASCE | $3^{5}/16$ | $3^{5}/16$ | $1^{3}/4$ | $23/64$ | $61/64$ | $1^{25}/32$ | $37/64$ | $1^{15}/32$ | — | — | — |
| 40 lb. | ASCE | $3^{1}/2$ | $3^{1}/2$ | $1^{7}/8$ | $25/64$ | $1^{1}/64$ | $1^{55}/64$ | $5/8$ | $1^{9}/16$ | — | — | — |
| 45 lb. | ASCE | $3^{11}/16$ | $3^{11}/16$ | 2 | $27/64$ | $1^{1}/16$ | $1^{31}/32$ | $21/32$ | $1^{41}/64$ | — | — | — |
| 50 lb. | ASCE | $3^{7}/8$ | $3^{7}/8$ | $2^{1}/8$ | $7/16$ | $1^{1}/8$ | $2^{1}/16$ | $11/16$ | $1^{23}/32$ | — | — | — |
| 55 lb. | ASCE | $4^{1}/16$ | $4^{1}/16$ | $2^{1}/4$ | $15/32$ | $1^{11}/64$ | $2^{11}/64$ | $23/32$ | $1^{103}/128$ | — | — | — |
| 60 lb. | ASCE | $4^{1}/4$ | $4^{1}/4$ | $2^{3}/8$ | $31/64$ | $1^{7}/32$ | $2^{17}/64$ | $49/64$ | $1^{115}/128$ | 6040 | 60 AS | 603 |
| | MISC. | $4^{1}/4$ | $4^{1}/16$ | $2^{5}/16$ | $1/2$ | $1^{7}/16$ | $2^{1}/8$ | $11/16$ | $1^{3}/4$ | 6051 | — | — |
| 65 lb. | ASCE | $4^{7}/16$ | $4^{7}/16$ | $2^{13}/32$ | $1/2$ | $1^{9}/32$ | $2^{3}/8$ | $25/32$ | $1^{31}/32$ | 6540 | 65 AS | 653 |
| 70 lb. | ASCE | $4^{5}/8$ | $4^{5}/8$ | $2^{7}/16$ | $33/64$ | $1^{11}/32$ | $2^{15}/32$ | $13/16$ | $2^{3}/64$ | 7040 | 70 AS | 701 |
| 75 lb. | ASCE | $4^{3}/16$ | $4^{3}/16$ | $2^{15}/32$ | $17/32$ | $1^{27}/64$ | $2^{35}/64$ | $27/32$ | $2^{15}/128$ | 7540 | 75 AS | 753 |
| | MO. PAC. | $4^{3}/4$ | $4^{3}/4$ | $2^{9}/16$ | $9/16$ | $1^{7}/16$ | $2^{15}/32$ | $27/32$ | $2^{5}/64$ | 7550 | 75 MP | — |
| | S. PAC. | $4^{15}/16$ | $4^{7}/16$ | $2^{7}/16$ | $33/64$ | $1^{3}/8$ | $2^{5}/8$ | $15/32$ | $2^{1}/4$ | 7524 | 75 SP | 757 |
| 80 lb. | ASCE | 5 | 5 | $2^{1}/2$ | $35/64$ | $1^{1}/2$ | $2^{5}/8$ | $7/8$ | $2^{3}/16$ | 8040 | 80 AS | 800 |
| | DUDLEY | $5^{1}/8$ | 5 | $2^{21}/32$ | $17/32$ | $1^{1}/2$ | $2^{3}/4$ | $7/8$ | $2^{1}/4$ | 8022 | 80 DY | — |
| 85 lb. | ASCE | $5^{3}/16$ | $5^{3}/16$ | $2^{9}/16$ | $9/16$ | $1^{35}/64$ | $2^{3}/4$ | $57/64$ | $2^{17}/64$ | 8540 | 85 AS | 851 |
| | CAN. PAC. | $5^{1}/8$ | 5 | $2^{1}/2$ | $9/16$ | $1^{7}/16$ | $2^{11}/16$ | 1 | $2^{11}/32$ | 8524 | 85 CP | — |
| | CB&Q | $5^{3}/16$ | $5^{3}/16$ | $2^{21}/32$ | $9/16$ | $1^{7}/16$ | $2^{3}/4$ | $57/64$ | $2^{17}/64$ | 8543 | 85 CB | 852 |
| | MO. PAC. | $5^{7}/32$ | $5^{1}/4$ | $2^{15}/32$ | $75/128$ | $1^{3}/4$ | $2^{39}/64$ | $55/64$ | $2^{21}/128$ | 8550 | — | — |
| | PS | $5^{1}/8$ | $4^{5}/8$ | $2^{1}/2$ | $17/32$ | $1^{21}/32$ | $2^{15}/32$ | 1 | $2^{15}/64$ | 8531 | 85 PS | — |
| | PRR | 5 | 5 | $2^{9}/16$ | $17/32$ | $1^{3}/4$ | $2^{3}/8$ | $7/8$ | $2^{1}/16$ | 8533 | 85 PR | — |
| | SOO LINE | $5^{3}/8$ | $4^{7}/8$ | $2^{1}/2$ | $9/16$ | $1^{15}/32$ | $2^{29}/32$ | 1 | $2^{29}/64$ | 8520 | — | — |
| 90 lb. | ASCE | $5^{3}/8$ | $5^{3}/8$ | $2^{5}/8$ | $9/16$ | $1^{19}/32$ | $2^{55}/64$ | $59/64$ | $2^{45}/128$ | 9040 | 90 AS | — |
| | ARA-A | $5^{5}/8$ | $5^{1}/8$ | $2^{9}/16$ | $9/16$ | $1^{15}/32$ | $3^{5}/32$ | 1 | $2^{37}/64$ | 9020 | 90 RA | 902 |
| | ARA-B | $5^{17}/64$ | 4 | $2^{9}/16$ | $9/16$ | $1^{39}/64$ | $2^{5}/8$ | $1^{1}/32$ | $2^{11}/32$ | 9030 | 90 RB | 905 |
| | AT&SF | $5^{5}/8$ | $49/64$ | $2^{9}/16$ | $9/16$ | $1^{15}/32$ | $3^{5}/32$ | 1 | $2^{37}/64$ | 9021 | 90 SF | 903 |
| | C&NW | $5^{17}/32$ | $5^{3}/16$ | $2^{1}/2$ | $1/2$ | $1^{17}/32$ | $2^{31}/32$ | $1^{1}/32$ | $2^{23}/64$ | 9035 | 90 OM | — |
| | D&RG | $5^{1}/2$ | $5^{3}/2$ | $2^{9}/16$ | $9/16$ | $1^{5}/8$ | $2^{7}/8$ | 1 | $2^{5}/8$ | — | — | 906 |
| | GRT. NO. | $5^{3}/8$ | $5^{1}/8$ | $2^{5}/8$ | $9/16$ | $1^{15}/32$ | $2^{7}/8$ | $1^{1}/32$ | $2^{15}/32$ | 9024 | 00 | — |
| | INTRBGH | 5 | 5 | $2^{7}/8$ | $11/16$ | $1^{25}/32$ | $2^{11}/32$ | $7/8$ | $2^{3}/64$ | 9050 | 90 RT | — |
| | U. PAC. | $5^{3}/4$ | 5 | $2^{3}/4$ | $17/32$ | $1^{1}/2$ | $3^{3}/8$ | $7/8$ | $2^{9}/16$ | 9023 | — | 901 |
| | DUDLEY | $5^{1}/2$ | $5^{3}/85$ | $2^{21}/32$ | $9/16$ | $1^{1}/2$ | $3^{1}/32$ | $31/32$ | $2^{3}/8$ | — | 90 DY | — |
| 100 lb. | ASCE | $5^{3}/4$ | $5^{3}/4$ | $2^{3}/4$ | $9/16$ | $1^{45}/64$ | $3^{5}/64$ | $31/32$ | $2^{65}/128$ | 10040 | 100 AS | — |
| | PS | $5^{11}/16$ | 5 | $2^{43}/64$ | $9/16$ | $1^{13}/16$ | $2^{25}/32$ | $13/32$ | $2^{31}/64$ | 10031 | 100 PS | — |
| | PRR | $5^{1}/2$ | $5^{1}/2$ | $2^{13}/16$ | $5/8$ | $1^{7}/8$ | $2^{11}/16$ | $15/16$ | $2^{9}/32$ | 10033 | 100 PR | — |
| | ARA-A | 6 | $5^{1}/2$ | $2^{3}/4$ | $9/16$ | $1^{9}/16$ | $3^{3}/8$ | $1^{1}/16$ | $2^{3}/4$ | 10020 | 100 RA | 1003 |
| | ARA-B | $5^{41}/64$ | $5^{9}/64$ | $2^{21}/32$ | $9/16$ | $1^{45}/64$ | $2^{55}/64$ | $15/64$ | $2^{65}/128$ | 10030 | 100 RB | 1002 |
| | AREA | 6 | $5^{5}/8$ | $2^{11}/16$ | $9/16$ | $1^{21}/32$ | $3^{9}/32$ | $1^{1}/16$ | $2^{45}/64$ | 10025 | 100 RE | 10025 |
| | C&NW | $5^{45}/64$ | $5^{9}/64$ | $2^{9}/16$ | $9/16$ | $1^{39}/64$ | $2^{61}/64$ | $19/64$ | $2^{79}/128$ | 10035 | 100 DM | — |
| | GRT. NO. | $5^{3}/4$ | 5 | $2^{3}/4$ | $9/16$ | $1^{5}/8$ | 3 | $1^{1}/8$ | $2^{5}/8$ | 10036 | 100 GN | — |
| | INTRBGH | $5^{3}/4$ | $5^{3}/4$ | $2^{7}/8$ | $9/16$ | $1^{45}/64$ | $3^{5}/64$ | $31/32$ | $2^{65}/128$ | 10005 | 100 RT | — |
| | NY. NH&H | 6 | $5^{1}/2$ | $2^{3}/4$ | $19/32$ | $1^{23}/32$ | $3^{11}/32$ | $15/16$ | $2^{39}/64$ | 10034 | 100 NH | — |
| | READING | $5^{5}/8$ | $5^{3}/8$ | $2^{21}/32$ | $9/16$ | $1^{45}/64$ | $2^{55}/64$ | $1^{1}/16$ | $2^{63}/128$ | 10032 | 100 RG | — |
| 101 lb. | DL&W | $5^{7}/16$ | $5^{3}/89$ | $2^{3}/4$ | $5/8$ | $1^{23}/32$ | $2^{11}/16$ | $1^{1}/32$ | $2^{3}/8$ | 10133 | 101 DL | — |
| 105 lb. | DL&W | 6 | $5^{3}/8$ | $2^{3}/4$ | $5/8$ | $1^{23}/32$ | $3^{1}/4$ | $1^{1}/32$ | $2^{21}/32$ | 10533 | 105 DL | — |
| | DUDLEY | 6 | $5^{1}/2$ | 3 | $5/8$ | $1^{5}/8$ | $3^{13}/32$ | $31/32$ | $2^{43}/64$ | 10524 | 105 DY | — |
| 110 lb. | AREA | $6^{1}/4$ | $5^{1}/2$ | $2^{25}/32$ | $19/32$ | $1^{23}/32$ | $3^{13}/32$ | $1^{1}/8$ | $2^{53}/64$ | 11025 | 110 RE | 1100 |
| | GR. NO. | $6^{1}/2$ | $5^{1}/2$ | $2^{3}/4$ | $19/32$ | $1^{5}/8$ | $3^{3}/4$ | $1^{1}/8$ | 3 | 11036 | 110 GN | — |
| | LE. VAL. | 6 | $5^{1}/2$ | $2^{7}/8$ | $19/32$ | $1^{7}/8$ | $3^{1}/16$ | $1^{1}/16$ | $2^{9}/16$ | 11033 | 110 LV | — |
| 112 lb. | AREA | $6^{5}/8$ | $5^{1}/2$ | $2^{23}/32$ | $19/32$ | $1^{11}/16$ | $3^{13}/32$ | $1^{1}/8$ | $2^{7}/8$ | 11228 | 112 RE | 1121 |
| | TR. | $6^{3}/4$ | $5^{1}/2$ | $2^{1}/2$ | $5/8$ | $1^{3}/4$ | $3^{7}/8$ | $1^{1}/8$ | $3^{1}/8$ | 11229 | — | 1122 |
| 113 lb. | SO. PAC. | $6^{3}/16$ | $5^{1}/2$ | $2^{11}/16$ | $19/32$ | $1^{7}/8$ | $3^{13}/16$ | $1^{1}/8$ | $3^{3}/4$ | — | — | 1130 |
| 115 lb. | AREA | $6^{5}/8$ | $5^{1}/2$ | $2^{23}/32$ | $5/8$ | $1^{11}/16$ | $3^{13}/32$ | $1^{1}/8$ | $2^{7}/8$ | 11525 | 115 RE | 1150 |
| | DUDLEY | $6^{1}/2$ | 5 12 | 3 | $5/8$ | $1^{11}/16$ | $3^{3}/4$ | $1^{1}/16$ | $3^{3}/8$ | 11522 | 115 DY | — |
| 119 lb. | AREA | $6^{13}/16$ | $5^{1}/2$ | $2^{21}/32$ | $5/8$ | $1^{7}/8$ | $3^{13}/32$ | $1^{1}/8$ | $2^{7}/8$ | 11937 | 119 RE | 1190 |
| 127 lb. | DUDLEY | 7 | $6^{1}/4$ | 3 | $21/32$ | $1^{11}/16$ | $4^{5}/32$ | $15/32$ | $3^{1}/8$ | 12723 | 127 DYM | — |
| 130 lb. | PS | $6^{5}/8$ | $5^{1}/2$ | 3 | $11/16$ | 2 | $3^{13}/32$ | $17/32$ | $2^{1}/4$ | 13031 | 130 PS | — |
| | AREA | $6^{3}/4$ | 6 | $2^{15}/16$ | $21/32$ | $1^{27}/32$ | $3^{11}/16$ | $17/32$ | $3^{1}/16$ | 13025 | 130 RE | 1300 |
| 131 lb. | AREA | $7^{1}/8$ | 6 | 3 | $21/32$ | $1^{3}/4$ | $4^{3}/16$ | $13/16$ | $3^{1}/4$ | 13128 | 131 RE | 1311 |
| 132 lb. | AREA | $7^{1}/8$ | 6 | 3 | $21/32$ | $1^{3}/4$ | $4^{3}/16$ | $13/16$ | $3^{3}/32$ | 13228 | 132 RE | 1321 |
| 133 lb. | AREA | $7^{1}/16$ | 6 | 3 | $11/16$ | $1^{15}/16$ | $3^{15}/16$ | $13/16$ | 3 | 13331 | — | 1330 |
| 136 lb. | LE. VAL. | 7 | $6^{1}/2$ | $2^{15}/16$ | $21/32$ | $1^{7}/8$ | $3^{7}/8$ | $1^{1}/4$ | $3^{3}/16$ | 13633 | 136 LV | — |
| | AREA | $7^{5}/16$ | 6 | $2^{15}/16$ | $11/16$ | $1^{15}/16$ | $4^{3}/16$ | $13/16$ | $3^{3}/32$ | 13622 | 136 RE | 13637 |
| 140 lb. | AREA | $7^{5}/16$ | 6 | 3 | $3/4$ | $2^{1}/16$ | $4^{1}/16$ | $13/16$ | 3 | — | 140 RE | — |
| | PS | $7^{5}/16$ | 6 | 3 | $3/4$ | $2^{1}/16$ | $4^{1}/16$ | $13/16$ | 3 | 14031 | 140 PS | — |

TABLE 1-continued

| | | | | DIMENSIONS IN INCHES | | | | | | | |
|---|---|---|---|---|---|---|---|---|---|---|---|
| Nominal Weight Per Yard | Type of Rail | HT (Height) | BW (Width of Base/ Foot) | HW (Width of Head) | W (Web at center point) | HD (Depth of Head) | FD (Fishing) | BD (Depth of Base) | E (Bolt Hole Elevation) | | SECTION DESIGNATION |
| 152 lb. | PS | 8 | 6¾ | 3 | ¹¹⁄₁₆ | 1²⁷⁄₃₂ | 4⅞ | 1⁹⁄₃₂ | 3¾ | 15222 | 152 PS — |
| 155 lb. | PS | 8 | 6¾ | 3 | ¾ | 2¹⁄₁₆ | 4²¹⁄₃₂ | 1⁹⁄₃₂ | 3⅜ | 15531 | 155 PS — |

TABLE 2

| Rail Weight and Section | Height (In.) | Base Width (In.) | Head Width (In.) | Web (In.) | Head Depth (In.) | Fishing (In.) | Base Depth (In.) | Bolt Hold Elevation (In.) | Section Designation |
|---|---|---|---|---|---|---|---|---|---|
| 175-CRANE | 6 | 6 | 4¼ | 1½ | 1¾ | 3⁷⁄₆₄ | 1⁹⁄₆₄ | 2²¹⁄₃₂ | 17551 |
| 171-CRANE | 6 | 6 | 4.3 | 1¼ | 2 | 2¾ | 1¼ | 2⅝ | 171CR |
| 140-AREA | 7⁵⁄₁₆ | 6 | 3 | ¾ | 2¹⁄₁₆ | 4¹⁄₁₆ | 1³⁄₁₆ | 3 | 14025 |
| 136-AREA | 7⁵⁄₁₆ | 6 | 2¹⁵⁄₁₆ | ¹¹⁄₁₆ | 1¹⁵⁄₁₆ | 4³⁄₁₆ | 1³⁄₁₆ | 33⁄32 | 13622 |
| 135-CRANE | 5¾ | 5³⁄₁₆ | 3⁷⁄₁₆ | 1¼ | 1⅞ | 2¹³⁄₁₆ | 1¹⁄₁₆ | 2¹⁵⁄₃₂ | 13551 |
| 133-AREA | 7¹⁄₁₆ | 6 | 3 | 1¹⁄₁₆ | 1¹⁵⁄₁₆ | 3¹⁵⁄₁₆ | 1³⁄₁₆ | 3 | 13331 |
| 132-AREA | 7⅛ | 6 | 3 | 2¹⁄₃₂ | 1¾ | 4³⁄₁₆ | 1³⁄₁₆ | 33⁄32 | 13225 |
| 131-AREA | 7⅛ | 6 | 3 | 2¹⁄₃₂ | 1¾ | 4³⁄₁₆ | 1³⁄₁₆ | 3¼ | 13128 |
| 119-AREA | 6¹³⁄₁₆ | 5½ | 2²¹⁄₃₂ | ⅝ | 1⅞ | 3¹³⁄₁₆ | 1⅛ | 2⅞ | 11925 |
| 115-AREA | 6⅝ | 5½ | 2²³⁄₃₂ | ⅝ | 1¹¹⁄₁₆ | 3¹³⁄₁₆ | 1⅛ | 2⅞ | 11525 |
| 112-AREA | 6⅝ | 5½ | 2²³⁄₃₂ | 1⁹⁄₃₂ | 1¹¹⁄₁₆ | 3¹³⁄₁₆ | 1⅛ | 2⅞ | 11225 |
| 110-AREA | 6¼ | 5½ | 2²⁵⁄₃₂ | 1⁹⁄₃₂ | 1²³⁄₃₂ | 3¹³⁄₃₂ | 1⅛ | 2⁵³⁄₆₄ | 11025 |
| 105-CRANE | 5³⁄₁₆ | 5³⁄₁₆ | 3 | 1⁵⁄₁₆ | 1²⁵⁄₃₂ | 2¹³⁄₃₂ | 1 | 2¹³⁄₆₄ | 10551 |
| 105-DUDLEY | 6 | 5½ | 2¾ | ⅝ | 1⅝ | 3¹³⁄₃₂ | 3¹⁄₃₂ | 2⁴³⁄₆₄ | 10524 |
| 104-CRANE | 5 | 5 | 2½ | 1 | 1½ | 2⁷⁄₁₆ | 1¹⁄₁₆ | 2⁷⁄₁₆ | 104CR |
| 100-ARA-A | 6 | 5½ | 2¾ | ⁹⁄₁₆ | 1⁹⁄₁₆ | 3⅜ | 1¹⁄₁₆ | 2¾ | 10020 |
| 100-ARA-B | 5⁴¹⁄₆₄ | 5⁹⁄₆₄ | 2²¹⁄₃₂ | ⁹⁄₁₆ | 1⁴⁵⁄₆₄ | 2⁵⁵⁄₆₄ | 1⁵⁄₆₄ | 2⁶⁵⁄₁₂₈ | 10030 |
| 100-AREA | 6 | 5⅜ | 2¹¹⁄₁₆ | ⁹⁄₁₆ | 1²¹⁄₃₂ | 3⁹⁄₃₂ | 1¹⁄₁₆ | 2⁴⁵⁄₆₄ | 10025 |
| 90-ASCE | 5⅜ | 5⅜ | 2⅝ | ⁹⁄₁₆ | 1¹⁹⁄₃₂ | 2⁵⁵⁄₆₄ | 5⁹⁄₆₄ | 2⁴⁵⁄₁₂₈ | 9040 |
| 90-ARA-A | 5⅝ | 5⅛ | 2⁹⁄₁₆ | ⁹⁄₁₆ | 1¹⁵⁄₃₂ | 3⁵⁄₃₂ | 1 | 2³⁷⁄₆₄ | 9020 |
| 90-ARA-B | 5¹⁷⁄₆₄ | 4⁴⁹⁄₆₄ | 2⁹⁄₁₆ | ⁹⁄₁₆ | 1³⁹⁄₆₄ | 2⅝ | 1¹⁄₃₂ | 2¹¹⁄₃₂ | 9030 |
| 85-ASCE | 5³⁄₁₆ | 5³⁄₁₆ | 2⁹⁄₁₆ | ⁹⁄₁₆ | 1³⁵⁄₆₄ | 2¾ | 5⁷⁄₆₄ | 2¹⁷⁄₆₄ | 8540 |
| 80-ASCE | 5 | 5 | 2½ | ³⁵⁄₆₄ | 1½ | 2⅝ | ⅞ | 2³⁄₁₆ | 8040 |
| 70-ASCE | 4⅝ | 4⅝ | 2¹⁄₁₆ | ³³⁄₆₄ | 1¹¹⁄₃₂ | 2¹⁵⁄₃₂ | 1³⁄₁₆ | 2³⁄₆₄ | 7040 |
| 60-ASCE | 4¼ | 4¼ | 2⅜ | ³¹⁄₆₄ | 1⁷⁄₃₂ | 2¹⁷⁄₆₄ | 4⁹⁄₆₄ | 1¹¹⁵⁄₁₂₈ | 6040 |
| 40-ASCE | 3½ | 3½ | 1⅞ | ²⁵⁄₆₄ | 1¹⁄₆₄ | 1⁵⁵⁄₆₄ | ⅝ | 1⁷¹⁄₁₂₈ | 4040 |
| 30-ASCE | 3⅛ | 3⅛ | 1¹¹⁄₁₆ | ²¹⁄₆₄ | ⅞ | 1²³⁄₃₂ | 1⁷⁄₃₂ | 1²⁵⁄₆₄ | 3040 |
| 25-ASCE | 2¾ | 2¾ | 1½ | 1⁹⁄₆₄ | ²⁵⁄₃₂ | 1³¹⁄₆₄ | 3¹⁄₆₄ | 1²⁹⁄₁₂₈ | 2540 |
| 20-ASCE | 2⅝ | 2⅝ | 1¹¹⁄₃₂ | ¼ | ²³⁄₃₂ | 1¹⁵⁄₃₂ | ⁷⁄₁₆ | 1¹¹⁄₁₆ | 2040 |
| 16-ASCE | 2⅜ | 2⅜ | 1¹¹⁄₆₄ | ⁷⁄₃₂ | ⁴¹⁄₆₄ | 1²³⁄₆₄ | ⅜ | 1¹⁄₁₆ | 1640 |
| 12-ASCE | 2 | 2 | 1 | ³⁄₁₆ | ⁹⁄₁₆ | 1³⁄₃₂ | ¹¹⁄₃₂ | ⁵⁷⁄₆₄ | 1240 |

As mentioned above, when the adjustable bar 70 and the base 68 align at seven different predetermined positions, each predetermined position corresponds to a different lb/yd AREA rail profile. For example, the first predetermined position (FIGS. 1-7 and 9-11) corresponds to a 133 and 140 lb/yd AREA rail profile, the second predetermined position (FIGS. 12 and 13) corresponds to a 130 lb/yd AREA rail profile, the third predetermined position (FIGS. 14-16) corresponds to a 132 lb/yd, 136 lb/yd, and 141 lb/yd AREA rail profile, the fourth predetermined position (FIGS. 17 and 18) corresponds to a 131 lb/yd AREA rail profile, the fifth predetermined position (FIGS. 19-21) corresponds to a 112 lb/yd, 115 lb/yd, and 119 lb/yd AREA rail profile, the sixth predetermined position (FIGS. 22 and 23) corresponds to a 110 lb/yd AREA rail profile, and the seventh predetermined position (FIGS. 24 and 25) corresponds to a 100 lb/yd AREA rail profile. As shown throughout FIGS. 9-25, the adjustable bar 70 moves with respect to the base 68 for aligning the adjustable rail 32 with respect to the base 68 in each of the seven predetermined positions for positioning the base 68 with respect to the rail 32, which, in turn, positions the cutter 52 with respect to the rail 32.

To help align the adjustable bar 70 with respect to the base 68 in each predetermined position, the plurality of position indicators 78 align with the plurality of base markings 120. To further help align the adjustable bar 70 with respect to the base 68 in each predetermined position, the adjustable bar 70 may define a plurality of adjustable bar markings 122 corresponding to the plurality position indicators 78, as shown in FIG. 8. To show the correlation of the plurality of adjustable bar markings 120 to the AREA standard rail profiles, the adjustable bar 68 defines numerals adjacent the plurality of adjustable bar markings 120. Typically, each of the plurality of base markings 120 and each of the plurality of adjustable bar markings 122 correspond to one of the other plurality of base markings 120 and plurality of adjustable bar markings 122. In other words, when the plurality of base markings 120 corresponds to 131 lb/yd, 132 lb/yd, 130 lb/yd, 133 lb/yd, 112 lb/yd, 110 lb/yd, 100 lb/yd, 136 lb/yd, 141 lb/yd, 140 lb/yd, 115 lb/yd, and 119 lb/yd AREA standard rail profiles, the plurality of adjustable bar markings 122 corresponds to 131 lb/yd, 132 lb/yd, 130 lb/yd, 133 lb/yd, 112 lb/yd, 110 lb/yd, 100 lb/yd, 136 lb/yd, 141 lb/yd, 140 lb/yd, 115 lb/yd, and 119 lb/yd AREA standard rail profiles. Additionally, when the plurality of base markings 120 corresponds to 131 lb/yd, 132 lb/yd, 130 lb/yd, 133 lb/yd, 112 lb/yd, 110 lb/yd, 100 lb/yd, 136 lb/yd, 141 lb/yd, 140 lb/yd, 115 lb/yd, and 119 lb/yd AREA standard rail profiles and the plurality of adjustable bar markings 122 corresponds to 131 lb/yd, 132 lb/yd, 130 lb/yd, 133 lb/yd, 112 lb/yd, 110 lb/yd, 100 lb/yd, 136 lb/yd, 141 lb/yd, 140 lb/yd, 115 lb/yd, and 119 lb/yd AREA standard rail profiles, the rail shoe assembly 56 is able to accommodate 12 different standard AREA rails. To aid in visualizing the predetermined positions, as shown throughout the Figures, the base 68 and/or the adjustable bar 70 may define or list each standard rail profile lb/yd numeral adjacent the plurality of base markings 120 and the plurality of adjustable bar markings 122, respectively.

In certain predetermined positions, only one of the plurality of base markings 120 and one of the plurality of adjustable bar markings 122 are alignable at the predetermined position. For example, when the adjustable bar 70 is in the second (FIGS. 12 and 13), fourth (FIGS. 17 and 18), sixth (FIGS. 22 and 23), and seventh (FIGS. 24 and 25) predetermined positions described above, only one of the plurality of base markings 120 and one of the plurality of adjustable bar markings 122 align at each respective predetermined position. To further help align the adjustable bar 70 with respect to the base 68, the adjustable bar has a bar surface 124 and the base 68 has a base surface 126 perpendicular to the bar surface 124 with the plurality of base markings 120 defined on the base surface 126 and the plurality of adjustable bar markings 122 defined on the bar surface 124. Each of the plurality of base markings 120 and the plurality of adjustable bar markings 122 may be defined on the base surface 126 and the bar surface 124, respectively.

Alternatively, a portion of the plurality of adjustable bar markings 122 may be defined on the bar surface 124. In this embodiment, the adjustable bar 70 has second bar surface 128 opposite the bar surface 124 and perpendicular to the base surface 126. In this embodiment, a portion of the plurality of base markings 120 and a portion of the plurality of adjustable bar markings 122 are defined on the base surface 126 and the bar surface 124, respectively. In this embodiment, another portion of the plurality of adjustable bar markings 122 are defined on the second bar surface 128 and another portion of the plurality of base markings 120 are defined adjacent the other portion of the plurality of adjustable bar markings 122 defined on the second bar surface 128. As such, when the adjustable bar 70 is in the first (FIGS. 1-7 and 9-11), third (FIGS. 14-16), and fifth (FIGS. 19-21) predetermined positions described above, two of the plurality of base markings 120 and two of the plurality of adjustable bar markings 122 align at each respective predetermined position.

As mentioned above, each predetermined position corresponds to certain standard rail profiles. As also mentioned above, the rail shoe assembly 56, specifically the base 68 and the adjustable bar 70, help to properly align the cutter 52 with respect to the web 37 of the rail 32. The location of the cutter 52 and proper alignment of the cutter 52 with respect to the rail 32 is known as the bolt hole elevation 48. The proper bolt hole elevation 48 changes depending on the rail profile.

By way of example, if the rail 32 is a 131 lb/yd AREA standard rail profile (FIGS. 17 and 18), the bolt hole elevation 48 is 3¼ inches. As such, the 131 numeral corresponding to the adjustable bar marking 122 on the bar surface 124 and the 131 numeral corresponding to the base marking 120 on the base surface 126 helps a user to visualize and align the corresponding adjustable bar marking 122 and the base marking 120. After alignment, the adjustable bar 70 is fixed to the base 68 by the pin 116 such that the adjustable bar 70 is fixed with respect to the base 68 in the fourth predetermined position. When the adjustable bar 70 is fixed in the fourth predetermined position and the bottom edge 72 of the adjustable bar 70 is engaged with the foot 33 of the rail 32, the cutter 52 is positioned with respect to the web 37 of the rail 32 such that the bolt hole elevation 48 to be cut is 3¼ inches.

By way of example, if the rail 32 is a 132 lb/yd, 136 lb/yd, or 141 lb/yd AREA standard rail profile (FIGS. 14-16), the bolt hole elevation 48 is 3$\frac{3}{32}$ inches. As such, the 132 numeral corresponding to the adjustable bar marking 122 on the bar surface 124 and the 132 numeral corresponding to the base marking 120 on the base surface 126, and both the 136 and 141 numerals corresponding to the adjustable bar marking 122 on the second bar surface 128 and the 136 and 141 numeral corresponding to the base marking 120 on the base surface 126 helps the user to visualize and align the corresponding adjustable bar marking 122 and the base marking 120. After alignment, the adjustable bar 70 is fixed to the base 68 by the pin 116 such that the adjustable bar 70 is fixed with respect to the base 68 in the third predetermined position. When the adjustable bar 70 is fixed in the third predetermined position and the bottom edge 72 of the adjustable bar 70 is engaged with the foot 33 of the rail 32, the cutter 52 is positioned with respect to the web 37 of the rail 32 such that the bolt hole elevation 48 to be cut is 3$\frac{3}{32}$ inches, which is a bolt hole elevation of $\frac{5}{32}$ inch less than when the adjustable bar 70 is in the fourth predetermined position (FIGS. 17 and 18).

By way of example, if the rail 32 is a 130 lb/yd AREA standard rail profile (FIGS. 12 and 13), the bolt hole elevation 48 is 3$\frac{1}{16}$ inches. As such, the 130 numeral corresponding to the adjustable bar marking 122 on the bar surface 124 and the 131 numeral corresponding with the base marking 120 on the base surface 126 helps the user to visualize and align the corresponding adjustable bar marking 122 and the base marking 120. After alignment, the adjustable bar 70 is fixed to the base 68 by the pin 116 such that the adjustable bar 70 is fixed with respect to the base 68 in the second predetermined position. When the adjustable bar 70 is fixed in the second predetermined position and the bottom edge 72 of the adjustable bar 70 is engaged with the foot 33 of the rail 32, the cutter 52 is positioned with respect to the web 37 of the rail 32 such that the bolt hole elevation 48 to be cut is 3$\frac{1}{16}$ inches, which is a bolt hole elevation of $\frac{1}{32}$ inch less than when the adjustable bar 70 is in the third predetermined position (FIGS. 14-16).

By way of example, if the rail 32 is a 133 lb/yd or 140 lb/yd AREA standard rail profile (FIGS. 1-7 and 9-11), the bolt hole elevation 48 is 3 inches. As such, the 133 numeral corresponding to the adjustable bar marking 122 on the bar surface 124 and the 133 numeral corresponding to the base marking 120 on the base surface 126, and the 140 numeral corresponding to the adjustable bar marking 122 on the second bar surface 128 and the 140 numeral corresponding to the base marking 120 on the base surface 126 helps the user to visualize and align the corresponding adjustable bar marking 122 and the base marking 120. After alignment, the adjustable bar 70 is fixed to the base 68 by the pin 116 such that the adjustable bar 70 is fixed with respect to the base 68 in the first predetermined position. When the adjustable bar 70 is fixed in the first predetermined position and the bottom edge 72 of the adjustable bar 70 is engaged with the foot 33 of the rail 32, the cutter 52 is positioned with respect to the web 37 of the rail 32 such that the bolt hole elevation 48 to be cut is 3 inches, which is a bolt hole elevation of $\frac{1}{16}$ inch less than when the adjustable bar 70 is in the second predetermined position (FIGS. 12-13).

By way of example, if the rail 32 is a 112 lb/yd, 115 lb/yd, or 119 lb/yd AREA standard rail profile (FIGS. 19-21), the bolt hole elevation 48 is 2⅞ inches. As such, the 112 numeral corresponding to the adjustable bar marking 122 on the bar surface 124 and the 112 numeral corresponding to the base marking 120 on the base surface 126, and both the 115 and 119 numeral corresponding to the adjustable bar marking 122 on the second bar surface 128 and the 115 and 119 numerals corresponding to the base marking 120 on the base surface 126 helps the user to visualize and align the corresponding adjustable bar marking 122 and the base marking 120. After alignment, the adjustable bar 70 is fixed to the base 68 by the pin 116 such that the adjustable bar 70 is fixed with respect to the base 68 in the fifth predetermined position. When the adjustable bar 70 is fixed in the fifth predetermined position and the bottom edge 72 of the adjustable bar 70 is engaged with the foot 33 of the rail 32, the cutter 52 is positioned with respect to the web 37 of the rail 32 such that the bolt hole elevation 48 to be cut is 2⅞ inches, which is a bolt hole elevation of ⅛ inch less than when the adjustable bar 70 is in the first predetermined position (FIGS. 1-7 and 9-11).

By way of example, if the rail 32 is a 110 lb/yd AREA standard rail profile (FIGS. 22 and 23), the bolt hole elevation 48 is 2⁵³⁄₆₄ inches. As such, the 110 numeral corresponding to the adjustable bar markings 122 on the bar surface 124 and the 110 numeral corresponding to the base marking 120 on the base surface 126 helps the user to visualize and align the corresponding adjustable bar marking 122 and the base marking 120. After alignment, the adjustable bar 70 is fixed to the base 68 by the pin 116 such that the adjustable bar 70 is fixed with respect to the base 68 in the sixth predetermined position. When the adjustable bar 70 is fixed in the sixth predetermined position and the bottom edge 72 of the adjustable bar 70 is engaged with the foot 33 of the rail 32, the cutter 52 is positioned with respect to the web 37 of the rail 32 such that the bolt hole elevation 48 to be cut is 2⁵³⁄₆₄ inches, which is a bolt hole elevation 48 of ³⁄₆₄ inch less than when the adjustable bar 70 is in the fifth predetermined position (FIGS. 19-21).

By way of example, if the rail 32 is a 100 lb/yd AREA standard rail profile (FIGS. 24 and 25), the bolt hole elevation 48 is 2⁴⁵⁄₆₄ inches. As such, the 100 numeral corresponding to the adjustable bar marking 122 on the bar surface 124 and the 100 numeral corresponding to the base marking 120 on the base surface 126 helps the user visualize and align the corresponding adjustable bar marking 122 and the base marking 120. After alignment, the adjustable bar 70 is fixed to the base 68 by the pin 116 such that the adjustable bar 70 is fixed with respect to the base 68 in the seventh predetermined position. When the adjustable bar 70 is fixed in the seventh predetermined position and the bottom edge 72 of the adjustable bar 70 is engaged with the foot 33 of the rail 32, the cutter 52 is positioned with respect to the web 37 of the rail 32 such that the bolt hole elevation 48 to be cut is 2⁴⁵⁄₆₄ inches, which is a bolt hole elevation 48 of ⅛ inch less than when the adjustable bar 70 is in the sixth predetermined position (FIGS. 22 and 23).

Although the Figures show the adjustable bar 70 in seven different positions, which correspond to seven different bolt hole elevations 48, it is to be appreciated that the adjustable bar 70 may be moveable up to 13 different predetermined positions, since the base 68 defines seven mounting chambers 76 and the adjustable bar 70 defines seven position indicators 78. Depending on the use of the rail shoe assembly 56, the base 68 may define more than seven or fewer than seven mounting chambers 76, and the adjustable bar may define more than seven or fewer than seven mounting chambers 76. For example, if the base 68 defines five mounting chambers 76 and the adjustable bar 70 defines five position indicators 78, the adjustable bar 70 may be moveable up to nine different predetermined positions. Likewise, if the base 68 defines eight mounting chambers 76 and the adjustable bar 70 defines eight position indicators 78, the adjustable bar 70 may be moveable up to 15 different predetermined positions. Further, if the base 68 defines three mounting chambers 76 and the adjustable bar 70 defines three position indicators 78, the adjustable bar 70 may be moveable up to five different predetermined positions. Further, if the base 68 defines two mounting chambers 76 and the adjustable bar 70 defines two position indicators 78, the adjustable bar 70 may be moveable up to three different predetermined positions. As mentioned above, the number of mounting chambers 76 and the number of position indicators 78 largely depends on the standard rail profile, i.e., AREA or others listed below. As such, depending on the standard rail profile used, the number of mounting chambers 76 and the number of position indicators 78 is selected accordingly to accommodate different bolt hole elevations 48.

Figure 26:
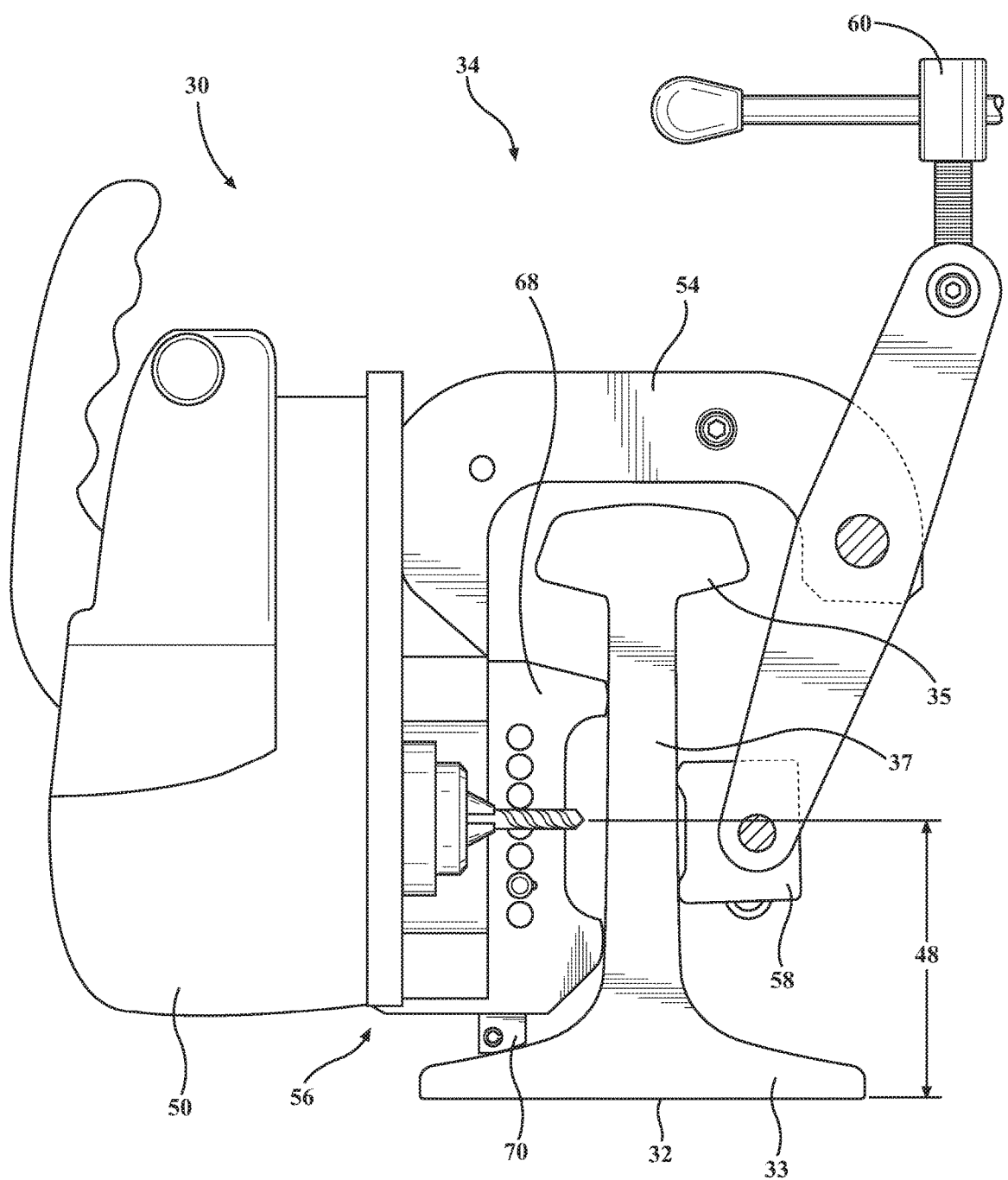
FIG. 26 is a side view of the rail, the support frame, the drill, the cutter, and the rail shoe assembly of FIG. 1 with the cutter in a first cutter position.
Figure 27:
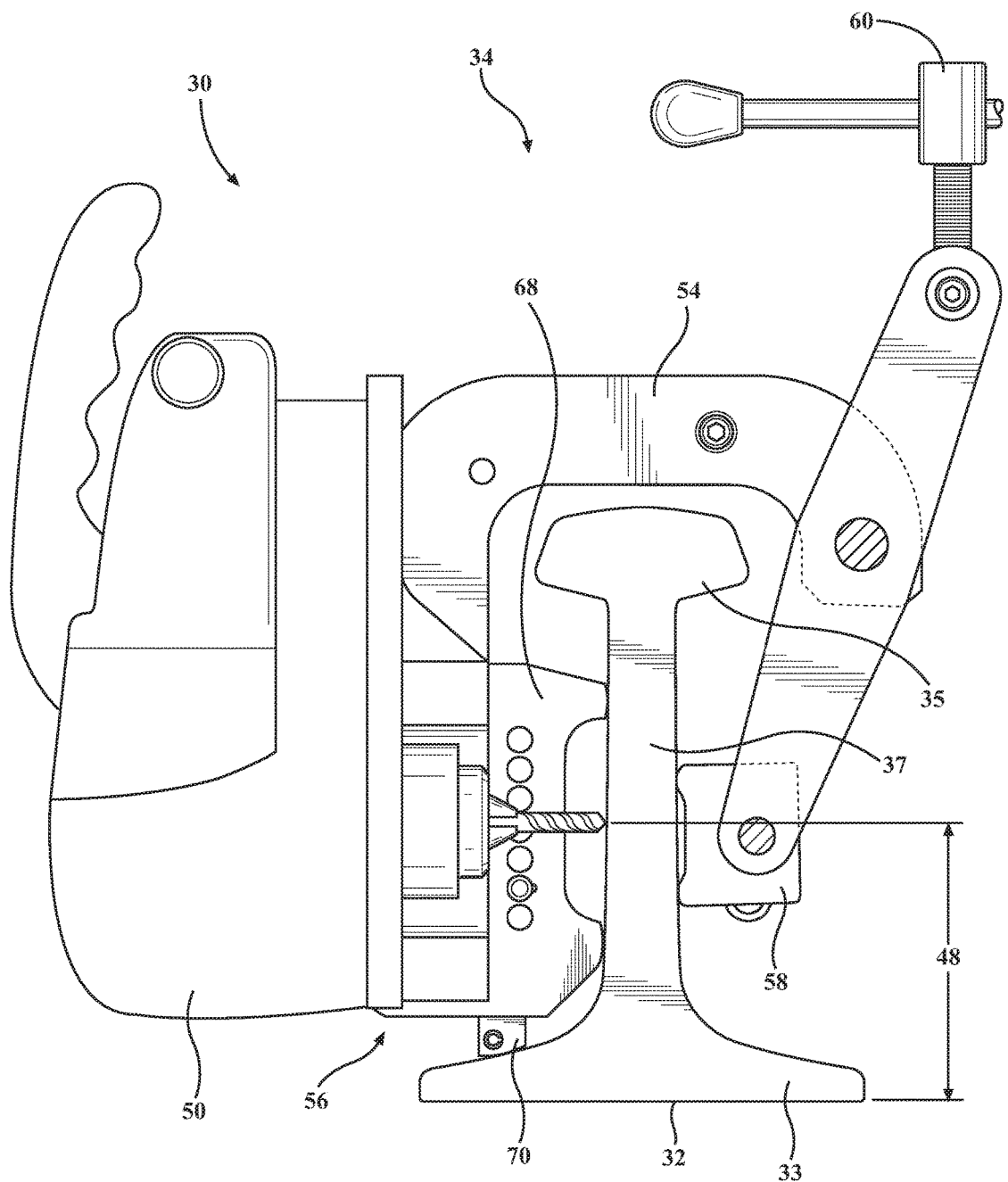
FIG. 27 is a side view of the rail, the support frame, the drill, the cutter, and the rail shoe assembly of FIG. 1 with the cutter in a second cutter position.

Once the cutter 52 is in the proper bolt hole elevation 48, the cutter 52, as best shown in FIGS. 26 and 27, is moveable between a first cutter position in FIG. 26 and a second cutter position in FIG. 27. The first cutter position is for spacing the cutter 52 from the rail 32, and the second cutter position is for engaging the rail 32 with the cutter 52 for drilling the hole. As mentioned above, the hole is drilled in the rail 32 for connecting two sections of railway together, which is done by drilling the hole in the web 37 of the rail 32.

It is to be appreciated that the plurality of position indicators 78 and the plurality of mounting chambers 76 may be designed, along with the plurality of base markings 120, the plurality of adjustable bar markings 122, and the corresponding numerals, for standard rail profiles other than AREA, such as American Society of Civil Engineers (ASCE) standard rail profiles, Pennsylvania System (PS) standard rail profiles, American Railroad Association Type "A" (ARA-A) standard rail profiles, American Railroad Association Type "B" (ARA-B) standard rail profiles, NYC (DUDLEY) standard rail profiles, New York Central & Hudson River Railroad standard rail profiles, PRR Pennsylvania Railroad standard rail profiles, Crane Rail standard rail profiles, Girder standard rail profiles, Missouri Pacific Railroad standard rail profiles, Southern Pacific Railroad standard rail profiles, Canadian Pacific Railroad standard rail profiles, Chicago, Burlington & Quincy Railroad (CB&Q) standard rail profiles, Pennsylvania Railroad standard rail profiles, Soo Line Railroad standard rail profiles, Chicago and North Western Railway (C&NW) standard rail profiles, Great Northern Railway standard rail profiles, American Railway Engineering and Maintenance-of-Way Association (AREMA), INTRBGH standard rail profiles, New York, New Haven and Hartford Railroad standard rail profiles, Reading Railway standard rail profiles, Delaware, Lackawanna and Western Railroad (DL&W) standard rail profiles, Grateley Rail standard rail profiles, Vehicle Automatique Leger (LE. VAL or VAL), and Tomahawk Railway (TR) standard rail profiles. Similarly, as described in the embodiments above, the plurality of position indicators 78 of the adjustable bar 70 and the plurality of mounting chambers 76 of the base 68 may be configured to correspond to various lb/yd ratings for each of the standard rail profiles.

Likewise, the plurality of base markings 120 and the plurality of adjustable bar markings 122 may be configured to correspond to the plurality of mounting chambers 76 and the plurality of position indicators 78. The specific configuration of the plurality of mounting chambers 76, the plurality of position indicators 78, the plurality of base markings 120, and the plurality of adjustable bar markings 122 depends on the bolt hole elevation 48 required for each different standard rail profile.

For example, for ASCE standard rail profiles, the rail shoe assembly 56 may be designed to accommodate up to 18 different rail profiles. Similarly, depending on the number of different rail profiles for each of the standard rail profiles listed above, the rail shoe assembly 56 may have a corresponding plurality of mounting chambers 76, plurality of position indicators 78, plurality of base markings 120, and/or plurality of adjustable bar markings 122 to accommodate different bolt hole elevation 48 requirements.

It is to be appreciated that various standard rail profile measurements may change. As such, the dimensions used throughout the written description are intended to be illustrative and not limiting to the exact dimensions provided.

It is to be appreciated that in the embodiments above, any one of the first, second, third, fourth, fifth, sixth, and seventh predetermined positions of the adjustable bar 70 may change with respect to the base 68 for positioning the base 68 with respect to the rail 32. In other words, the first predetermined position may correspond to a bolt hole elevation 48 that is greater than the seventh predetermined position, or the first predetermined position may correspond to a bolt hole elevation 48 that is less than the seventh predetermined position. Likewise, any of the predetermined positions may change bolt hole elevation 48 with respect to one another without departing from the nature of the present invention.

It is to be appreciated that the configurations of the rail shoe assembly 56, the support frame 54, the rail 32, the drilling machine 30, and the cutter 52 shown throughout the Figures are merely illustrative and may not be drawn to scale. It is to be further appreciated that the height 36 of the rail 32, width of the foot 38, depth of the foot 40, width of the head 42, depth of the head 44, fishing depth 46, and bolt hole elevation 48 shown throughout the Figures is merely illustrative and may not be drawn to scale.

A method of mounting the drilling machine 30 to the rail 32 includes the step of analyzing the head 35, foot 33, and web 37 of the rail 32 to determine the bolt hole elevation 48 required for drilling a hole in the web 37 of the rail 32. The method further includes the step of attaching the base 68 of the rail shoe assembly 56 to the drill 50 with respect to the support frame 54. The method further includes the step of sliding the adjustable bar 70 relative to the base 68. The method further includes the step of aligning one of the plurality of position indicators 78 of the adjustable bar 70 with one of the plurality of mounting chambers 76 of the base 68 in a predetermined position. The method further includes the step of fixing the adjustable bar 70 with respect to the base 68 in the predetermined position. To fix the adjustable bar 70 with respect to the base 68, the method may additionally include the step of disposing the pin 116 through one of the plurality of position indicators 78 and one of the plurality of mounting chambers 76 to align the adjustable bar 70 relative to the base 68. The method further includes the step of mounting the drill 50 to the rail 32 by mounting the support frame 54 and the rail shoe assembly 56 to the rail 32 by touching the adjustable bar 70 to the foot 33 of the rail 32, the front edge 84 of the base 68 to the web, and the support frame 54 to the web 37 opposite the front edge 84 of the base 68. The method additionally includes the step of tightening the support frame 54 with respect to the rail 32 and the base 68 to fix the drill 50 to the rail 32.

The invention has been described in an illustrative manner, and it is to be understood that the terminology, which has been used, is intended to be in the nature of words of description rather than of limitation. Many modifications and variations of the present invention are possible in light of the above teachings, and the invention may be practiced otherwise than as specifically described.

What is claimed is:

1. A rail shoe assembly for mounting a drilling machine to a rail of a railway track, with the drilling machine including a drill, a cutter, and a support frame with the support frame mounted to the rail of the railway track, said rail shoe assembly comprising:
   a base adapted to be positioned with respect to the rail and adapted to be coupled to the support frame; and
   an adjustable bar coupled to and slideable relative to said base, with said adjustable bar having a bottom edge for engagement with the rail, and with said adjustable bar defining a plurality of position indicators; wherein
   said base defines a plurality of mounting chambers, with at least one of said plurality of position indicators and at least one of said plurality of mounting chambers being alignable at a predetermined position for positioning said base relative to the rail such that the drill and the cutter are positioned relative to the rail.

2. The rail shoe assembly as set forth in claim 1, wherein said plurality of position indicators and said plurality of mounting chambers are alignable at two or more predetermined positions.

3. The rail shoe assembly as set forth in claim 2, wherein said plurality of position indicators and said plurality of mounting chambers are alignable at five or more predetermined positions.

4. The rail shoe assembly as set forth in claim 1, wherein said base defines at least three of said mounting chambers.

5. The rail shoe assembly as set forth in claim 4, wherein said adjustable bar defines at least three of said position indicators.

6. The rail shoe assembly as set forth in claim 5, wherein said base defines at least five of said mounting chambers.

7. The rail shoe assembly as set forth in claim 6, wherein said adjustable bar defines at least five of said position indicators.

8. The rail shoe assembly as set forth in claim 5, wherein said mounting chambers each define a chamber length between one another, with said chamber length equidistant between each mounting chamber.

9. The rail shoe assembly as set forth in claim 8, wherein said plurality of position indicators define an indicator length between one another, with said indicator length different from said chamber length.

10. The rail shoe assembly as set forth in claim 1, wherein only one of said plurality of position indicators and one of said plurality of mounting chambers are alignable at said predetermined position.

11. The rail shoe assembly as set forth in claim 10, wherein two of said plurality of position indicators are alignable at said predetermined position.

12. The rail shoe assembly as set forth in claim 1, wherein said plurality of mounting chambers are partially defined through said base.

13. The rail shoe assembly as set forth in claim 12, wherein said plurality of mounting chambers are fully defined through said base.

14. The rail shoe assembly as set forth in claim 1, wherein said plurality of position indicators are partially defined through said adjustable bar.

15. The rail shoe assembly as set forth in claim 14, wherein said plurality of position indicators are fully defined through said adjustable bar.

16. The rail shoe assembly as set forth in claim 15 further comprising a pin engageable with said base and said adjustable bar, with said plurality of mounting chambers fully defined through said base, with said pin extendable through one of said plurality of position indicators and one of said plurality of mounting chambers, and with said pin adapted to fix said adjustable bar and said base relative to one another in said predetermined position.

17. The rail shoe assembly as set forth in claim 1, wherein said base defines a plurality of base markings corresponding to said plurality of mounting chambers.

18. The rail shoe assembly as set forth in claim 1, wherein said adjustable bar defines a plurality of adjustable bar markings corresponding to said plurality position indicators.

19. The rail shoe assembly as set forth in claim 18, wherein said base defines a plurality of base markings corresponding to said plurality of mounting chambers, and wherein each of said plurality of base markings and each of said plurality of adjustable bar markings correspond to one of the other of said plurality of base markings and said plurality of adjustable bar markings.

20. The rail shoe assembly as set forth in claim 19, wherein said adjustable bar has a bar surface, and said base has a base surface perpendicular to said bar surface, with said plurality of base markings defined on said base surface and said plurality of adjustable bar markings defined on said bar surface.

21. The rail shoe assembly as set forth in claim 20, wherein said adjustable bar has a second bar surface opposite said bar surface and perpendicular to said base surface, with a portion of said plurality of adjustable bar markings defined on said second bar surface.

22. The rail shoe assembly as set forth in claim 1 further comprising a pin engageable with at least one of said adjustable bar and said base for fixing said adjustable bar and said base relative to one another in said predetermined position.

23. A drilling machine for in situ drilling of a hole in a rail for a railway track, said drilling machine comprising:

a support frame adapted to be mounted to the rail;
a drill coupled to said support frame;
a cutter coupled to said drill, with said cutter moveable between a first cutter position for spacing said cutter from the rail, and a second cutter position for engaging the rail with said cutter for drilling the hole; and
a rail shoe assembly comprising,
   a base coupled to said support frame, and
   an adjustable bar coupled to and slideable relative to said base, with said adjustable bar having a bottom edge for engagement with the rail, and with said adjustable bar defining a plurality of position indicators; wherein
said base defines a plurality of mounting chambers, with at least one of said plurality of position indicators and at least one of said plurality of mounting chambers being alignable at a predetermined position for positioning said cutter relative to the rail.

24. A system for in situ drilling of a hole, said system comprising:

a rail having a foot, a head, and a web disposed between said foot and said head;
a support frame adapted to be mounted to said rail;
a drill coupled to said support frame;
a cutter coupled to said drill, with said cutter moveable between a first cutter position for spacing said cutter from said rail, and a second cutter position for engaging said web of said rail with said cutter for drilling the hole;
a rail shoe assembly comprising,
   a base coupled to said support frame, and
   an adjustable bar coupled to and slideable relative to said base, with said adjustable bar having a bottom edge for engagement with said foot of said rail, and with said adjustable bar defining a plurality of position indicators; wherein
said base defines a plurality of mounting chambers, with at least one of said plurality of position indicators and at least one of said plurality of mounting chambers being alignable at a predetermined position for positioning said cutter between said foot and said head of said rail.

* * * * *